United States Patent
Strolle et al.

(10) Patent No.: US 7,194,047 B2
(45) Date of Patent: Mar. 20, 2007

(54) RECEIVER FOR ROBUST DATA EXTENSION FOR 8VSB SIGNALING

(75) Inventors: Christopher H Strolle, Ft. Washington, PA (US); Samir N Hulyalkar, Plainsboro, NJ (US); Jeffrey S Hamilton, Doylestown, PA (US); Haosong Fu, Levittown, PA (US); Troy A Schaffer, Newtown, PA (US)

(73) Assignee: ATI Technologies Inc., Ontario (CA)

( * ) Notice: Subject to any disclaimer, the term of this patent is extended or adjusted under 35 U.S.C. 154(b) by 325 days.

(21) Appl. No.: 10/251,650

(22) Filed: Sep. 20, 2002

(65) Prior Publication Data

US 2004/0057535 A1 Mar. 25, 2004

(51) Int. Cl.
*H03D 1/00* (2006.01)
*H03M 13/03* (2006.01)

(52) U.S. Cl. ............ 375/341; 375/262; 714/795; 714/796

(58) Field of Classification Search ........... 375/219, 375/262, 265, 316, 340, 341, 229, 231, 232; 370/335, 343, 347, 537; 714/795, 796
See application file for complete search history.

(56) References Cited

U.S. PATENT DOCUMENTS 5,991,285 A * 11/1999 Ghosh .................. 370/335
6,256,302 B1 * 7/2001 Siegle et al. ............ 370/343
6,337,867 B1 * 1/2002 Ejiri ..................... 370/537
6,385,239 B1 * 5/2002 Okamoto et al. .......... 375/232
6,427,135 B1 * 7/2002 Miseki et al. ............ 704/258
6,507,927 B1 * 1/2003 Kalliojarvi .............. 714/795
6,553,021 B1 * 4/2003 Bishop et al. ............ 370/347

FOREIGN PATENT DOCUMENTS

DE WO 97/11539 * 3/1997
WO WO 02/03678 * 1/2002

* cited by examiner

*Primary Examiner*—Kevin Kim
(74) *Attorney, Agent, or Firm*—Allan Jacobson

(57) ABSTRACT

A robust data extension, added to a standard 8VSB digital television signal, is used to improve the performance of a digital television receiver. Robust data packets are encoded at a 1/3-trellis rate as compared to normal data packets that are encoded at a 2/3-trellis rate. In addition to delivery of robust data for mobile applications, the redundant robust data packets also improve the performance of the receiver in the normal tier of service. In particular, the robust data packets improve the performance of the receiver equalizer filter in the presence of rapidly changing transient channel conditions such as dynamic multipath for both robust data packets and normal data packets. The robust data packets improve the performance of the carrier recovery loop and the symbol timing recovery loop. Backward compatibility with existing receivers is maintained for 1) 8VSB signaling, 2) trellis encoding and decoding, 3) Reed Solomon encoding and decoding, and 4) MPEG compatibility.

86 Claims, 20 Drawing Sheets

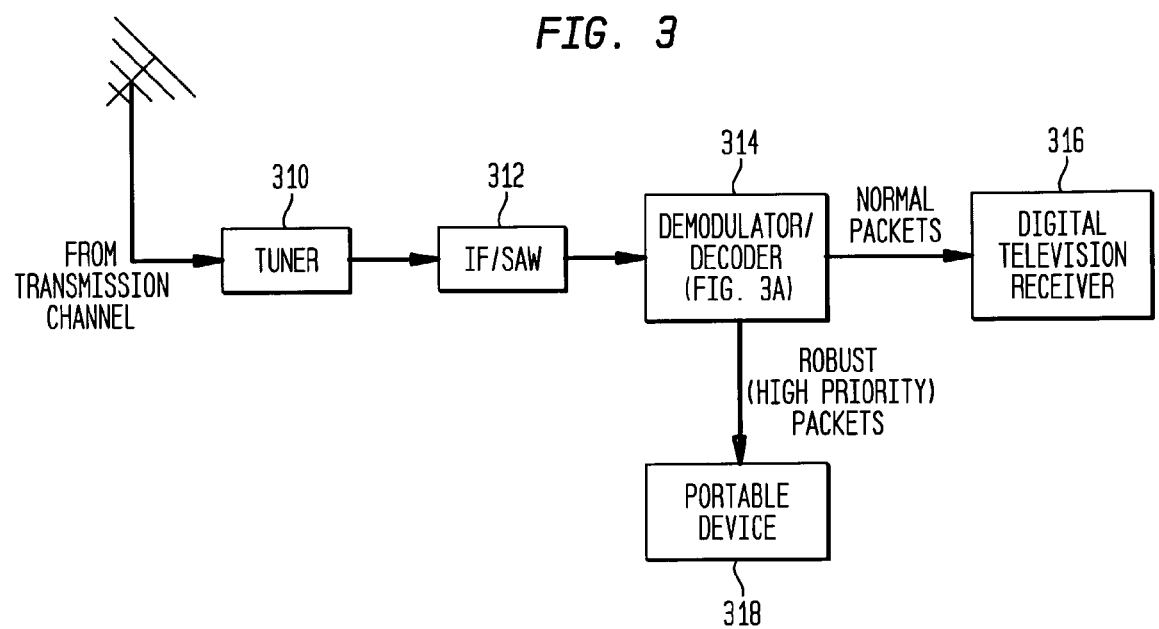

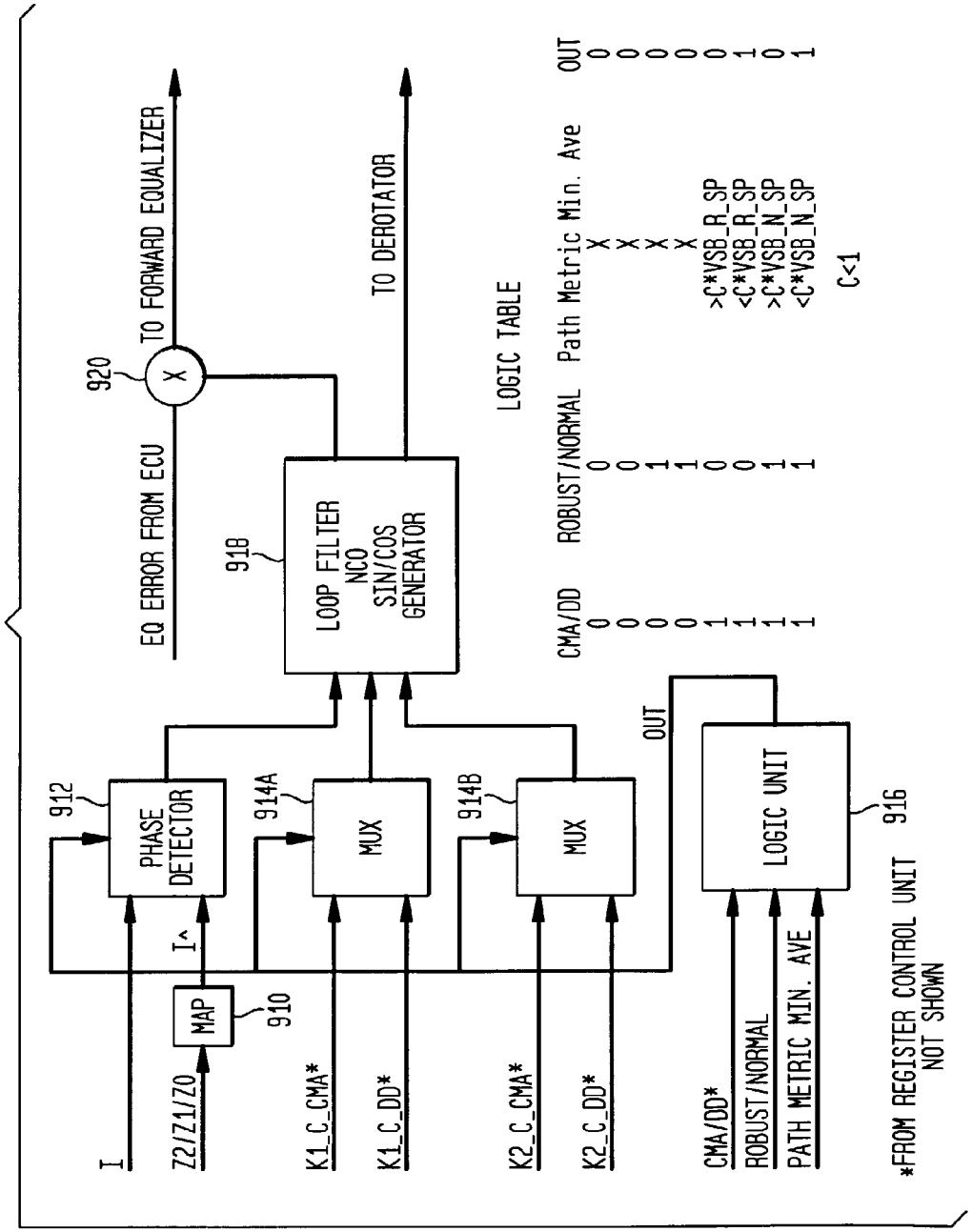

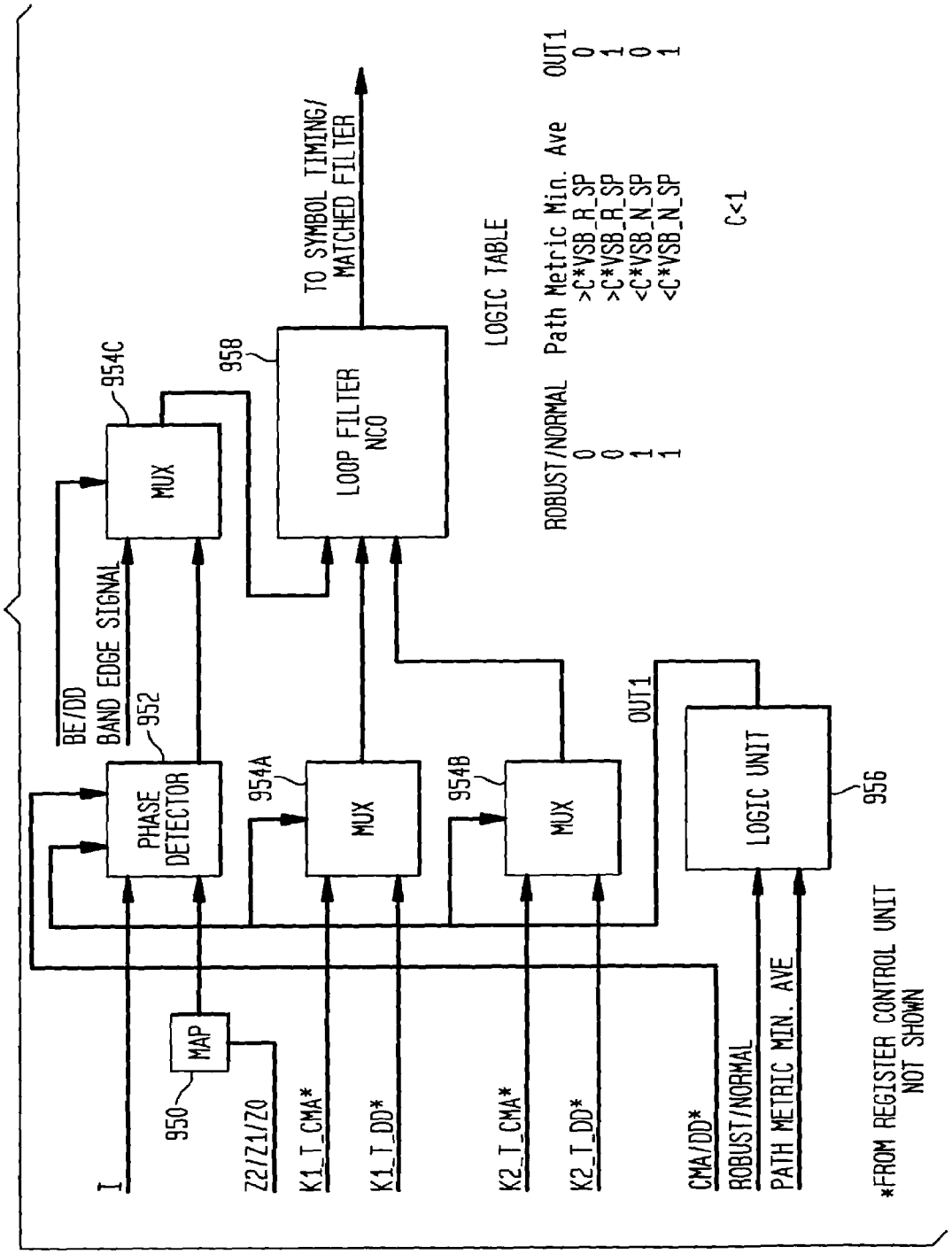

RECEIVER FOR ROBUST DATA EXTENSION FOR 8VSB SIGNALING

FIELD OF THE INVENTION

The present invention relates to a method and apparatus for improving the robustness of digital communications systems.

BACKGROUND OF THE INVENTION

The American Television Standards Committee (ATSC) transmission format for digital television (DTV) uses an 8 level vestigial sideband (8VSB) technique in which each successive 3 bit symbol is transmitted as one of 8 possible signal amplitudes. In a 4VSB system, each successive 2-bit symbol is transmitted as one of 4 possible signal amplitudes. In a 2VSB system, each successive 1-bit symbol is transmitted as one of 2 possible signal amplitudes. A 2VSB signal (or 4VSB signal) is more robust than an 8VSB signal because the distance between permissible signal levels is greater, making the transmitted signal more impervious to noise bursts and signal distortions.

It would be desirable to add a robust extension to the ATSC transmission format to enable the TV broadcasters to serve both the HDTV fixed receiver market and the portable market. Simultaneously, there has been a recent proposal within the ATSC to add "training packets" to the ATSC signal to enhance the receivability of the current DTV signal. The ATSC format was designed primarily for fixed reception and is not currently well optimized for robust reception. The only suggestion to date for a robust mode for the ATSC standard was the use of a 2VSB signaling mode during robust transmissions. Unfortunately, a 2VSB signaling mode is not backward compatible with the existing 8VSB format for a number of reasons. First of all, 2 level signaling would render the current generation of advanced demodulator IC's that utilize blind equalization techniques obsolete. When the ATSC format was originally adopted, it was believed that the training sequence, which occur every 24 milliseconds, would be sufficient for tracking both static and dynamic multi-path. It has been determined through extensive field-testing that the repetition rate of the training sequence is too low to track dynamic multi-path. The problem of tracking dynamic multi-path changes occurring in less than 24 milliseconds has been partially solved by a number of the newer generation of receivers by utilizing blind equalization to acquire the VSB signal. One particularly effective type of blind equalization is the Constant Modulus Algorithm (CMA) that uses a third order error function to effectively "open the eye" so that decision directed equalization can be used. The CMA error function used for VSB is a real only valued signal since the received symbols at the slicer are real only since the q-component is the Hilbert transform of the real part. The introduction of 2VSB symbols interspersed with 8VSB symbols would cause the CMA error function to be mismatched. The detailed cause of the mismatch is outlined below.

The symbol set for 8VSB is $\{-7, -5, -3, -1, 1, 3, 5, 7\}$. In order to make 2VSB signaling backward compatible when operating in a decision directed mode, the transmitted symbols should be bipolar and from the 8VSB set. A natural choice would be $\{+5, -5\}$, however, it can be shown that this chosen symbol set as well as any other bipolar set from the 8VSB set is incompatible with the 8VSB set itself when utilizing blind equalization such as CMA. The incompatibility arises since the constant modulus for the 2VSB symbols is different from the one needed for the 8VSB symbols.

The modulus for the 8VSB symbols is: $E\{X^{}4\}/E\{X^{}2\}$ where X is the transmitted symbols and E is the expected value. The required modulus to drive the received symbols to the desired levels of $\{-7, -5, -3, -1, 3, 5, 7\}$ so that decision directed equalization can be used is:

$$((-7)^4+(-5)^4+(-3)^4+(-1)^4+(1)^4+(3)^4+(5)^4+(7)^4)/((-7)^2+(-5)^2+(-1)^2+(1)^2+(3)^2+(5)^2+(7)^2)=37.$$

However, the modulus for the 2VSB symbol set $\{-5, 5\}$ is:

$$((-5)^4+(5)^4)/((-5)^2+(5)^2)=25.$$

And the modulus for the 2VSB symbol set $\{-7, 7\}$ is $$((-7)^4+(7)^4)/((-7)^2+(7)^2)=49.$$

Therefore it can be seen that either form of 2VSB: $\{-5, 5\}$ or $\{-7, 7\}$ is incompatible with 8VSB signaling with respect to the modulus requirements for blind equalization. Therefore, if the 2VSB signaling format is used with existing (i.e., legacy) demodulator ICs that use the 8VSB modulus for blind equalization, the equalized symbol levels will be incompatible with the levels needed for decision directed mode. More specifically, if the 2VSB symbols $\{-5, 5\}$ are interspersed with 8VSB symbols, the equalized received symbols will be greater in level than expected by legacy (i.e., existing) receivers, reflecting the fact that the expected value of the 2VSB symbols is lower that the 8VSB symbols on average. The blind equalizer then will compensate for this level mismatch by creating a new symbol set with an effective modulus of 37. Conversely, if the 2VSB symbols $\{-7, 7\}$ are used, the equalized symbols will be lower in level than expected. The mismatch between CMA and decision directed symbol levels is a function of the number of 2VSB symbols injected into the 8VSB symbol stream. Also, the mismatch will lead to a failure to acquire the signal when there is severe multi-path and/or significant gaussian noise and the critical handoff from blind to decision directed is compromised.

The introduction of training packets to aid equalization reduces the payload capacity of the channel. Each 8VSB symbol carries 2 bits of information and 1 bit of redundancy introduced by the trellis code. This type of coding is referred to as 2/3 rate trellis coding. Symbols that are derived from known training packets contain 0 bits of information and 3 bits of redundancy. Two of the redundant bits come from the known training packet in the payload itself and 1 additional bit of redundancy from the trellis code. These types of symbols are referred to as 0/3 rate symbols. Since 0/3 rate symbols carry no information, they are simply overhead, and are to be avoided if at all possible.

SUMMARY OF THE INVENTION

The present invention is embodied in the ATSC compliant embedding of information bearing symbols that 1) create a more robust tier of service, and simultaneously 2) enhance the performance of the equalizer in the receiver, thereby improving the receivability of the normal tier of service.

In addition to creating a more robust tier of service, backward compatibility with existing ATSC compliant receivers and transmitters must be maintained. The legacy requirements of the existing ATSC standard dictate that the robust tier of service must meet four requirements of backward compatibility:

8 VSB

Robust data packets must appear at the receiver to have the characteristics of an 8 VSB signal. In particular, the modulus of the symbol set for robust data transmission must be the same as that for an 8 VSB signal.

Trellis Encoding and Decoding

Robust data packets must use the existing trellis encoder at the transmitter and the existing trellis decoder at the receiver.

Reed Solomon Coding

Robust data packets must generate valid Reed Solomon parity bytes so that existing receivers do not flag robust data packets as having Reed Solomon parity errors.

MPEG Compliance

Robust data packets must maintain the MPEG format. In particular, robust data packets must not appear as false MPEG packets that can destabilize the existing MPEG decoder.

All of the above four compatibility requirements are met by the system of the present invention.

8 VSB and Trellis Encoding and Decoding

Assume that one or more high priority data packets (also referred to as robust data packets) at the transmitter represent the data to be transported by the presently added robust tier of service while maintaining 8VSB and trellis encoding compatibility. The high priority data packets are first encoded in a rate 1/2 trellis encoder and multiplexed with normal priority data packets. The additional 1/2 rate trellis encoder and robust/normal packet multiplexer represent the hardware added to the existing 8VSB transmitter to implement the present invention. The 1/2 rate trellis encoded packets multiplexed with normal packets are then inserted into the unmodified data service of the existing 8VSB transmitter in synchronism with the system frame sync signal to form a transmitted tier of robust data packets.

The standard 8VSB system normally includes a rate 2/3 trellis encoder as part of the existing ATSC system standard. The result of inserting the rate 1/2 trellis encoded high priority data packets into a standard ATSC transmission system is that the high priority data packets are further encoded in a rate 2/3 trellis encoder. The net result of the double trellis encoding (first at a rate 1/2, then at a rate 2/3) is a rate 1/3 trellis encoded signal during robust data packet transmission. A rate 1/3 trellis encoded signal, transmitted in the 3-bit symbol interval of an 8VSB signal, has substantially more robustness as compared to a 1-bit 2VSB signal. At the same time, the present invention preserves the 8VSB signal characteristics for all other system purposes. Thus, the advantages of a 2VSB system are achieved, while the backward compatibility of an 8VSB trellis encoded system is retained.

In addition, the ATSC standard provides for integral pre-coding of one of the data bits (X2). Integral pre-coding results in a performance loss of at least 1.25 dB for robust data. Integral pre-coding is defeated (i.e., cancelled or undone) by first differentiating the robust data. Since differentiation is the reverse operation of integration, the net effect is to cancel the effect of the integral pre-coder. The advantage of defeating (undoing) the integral pre-coder during robust data transmission is that it produces a systematic trellis code.

In accordance with another aspect of the present invention, potential errors resulting from the pre-coder defeat are avoided by the use of a selectable inversion or non-inversion of the transmitted data. Errors, which are manifested as a phase inversion, can occur upon a transition from robust to normal packet transmission. The difference between the actual and computed normal data is monitored, and any difference is detected and used to activate an invert/non-invert circuit. Operation of the invert/non invert circuit avoids potential phase errors in the normal data resulting from defeat of the integral pre-coder during robust data transmission.

Reed Solomon Coding

With respect to Reed Solomon encoding compatibility, robust data packets must transmit Reed Solomon parity bytes as normal data so that existing receivers do not flag robust data packets as having Reed Solomon errors. However, transmitting Reed Solomon parity bytes as normal data compromises the reliability of the robust data packet. In effect, robust data packets lose the benefit of Reed Solomon coding because the Reed Solomon parity bytes themselves are not a robust data transmission. Specifically, during adverse transmission channel conditions wherein normal data is not receivable, the Reed Solomon parity bytes will not be received. In accordance with a further aspect of the system of the present invention, an additional level of Reed Solomon coding is encapsulated within the robust data packet.

MPEG Compliance

With respect to MPEG compliance, high priority packets are made smaller than the standard MPEG data packet. In the invention of the present system, a data pre-processor adds parity bytes to the robust data packet, to create a robust MPEG data packet. To ensure backward compatibility, the header bytes for the robust MPEG data packet are encoded with a NULL packet header and encoded as normal data.

System with Compatible Robust Data Extension

The resulting transmitted data stream contains normal (rate 2/3 trellis encoded) data packets multiplexed with high priority (rate 1/3 trellis encoded) data packets. The receiver detects the reserved bit field of the standard ATSC frame sync signal and stores the received robust mode tier control code. Frame synchronization of the trellis encoded high priority data packets permits the receiver to synchronously switch to robust mode whenever a robust data packet is being received and switch back to normal mode whenever a normal data packet is being received. In robust mode, the receiver of the present invention uses the received robust data packets to 1) receive data with more reliability and additionally 2) to more rapidly adjust the equalizer to track transient channel conditions such as dynamic multipath. Legacy receivers ignore the reserved bit field.

Thus, the system of the present invention adds a robust tier of service to a standard 8VSB transmitter while preserving backward compatibility for existing 8VSB receivers. In addition, existing unmodified 8VSB transmitters need no internal modifications for use with the present invention other than to install the additional hardware required to implement the robust tier of service. A further aspect of the invention is that the new information-bearing symbols (the robust data packets) are trellis encoded such that the sub-states of this trellis code are compliant with the ATSC trellis code. Another aspect of the present invention is that ATSC trellis code is strengthened (during reception of robust data packets) such that the receivability of the normal tier (during reception of normal data packets) is improved.

Thus, in the present system, the normal tier of service contains 8VSB symbols that are encoded at a rate of 2/3 and the robust tier of service contains 8VSB symbols that are encoded at a rate of 1/3. The ATSC training signal and segment sync symbols are encoded at a rate of 0/3.

In accordance with one aspect of the present invention, a robust data receiver includes a two-tier trellis decoder for decoding a first tier or normal data packets and a second tier of robust data packets.

In accordance with a second aspect of the present invention, a robust data receiver includes a dual phase two-tier trellis decoder for resolving phase ambiguity in decoding the second tier of robust data packets.

Another aspect of the invention is the use of the two-tier service to control the equalizer in channel conditions where the robust symbols are received reliably and the normal symbols are not. In this condition, the equalizer is stabilized by the constant yet random insertion of correct symbols into the decision feedback equalizer. Additionally, if the normal symbols are not receivable because of excessive inter-symbol interference (ISI), the robust symbols will help the equalizer to automatically remove the excess ISI so that the equalizer can converge fully and use directed mode for the normal symbols as well.

An aspect of the invention is the use of the two-tier service to control the carrier recovery loop. Yet another aspect of the invention is the use of the two-tier service to control the symbol timing recovery loop.

In robust mode, the receiver of the present invention uses partial trellis decoding to predict 2 of the 3 bits of the 8VSB symbol. The predicted 2 bits from the partial trellis decoders are used to set a single decision level boundary of a smart slicer. Being able to set the slicer to a single decision boundary level is analogous to the fixed decision boundary level of a 2VSB slicer, except that the single level in the present invention is selected from one of the 8VSB signal boundary levels, on a dynamic symbol by symbol basis.

BRIEF DESCRIPTION OF THE DRAWINGS

FIG. 2b is a detailed block diagram of Inverter/Non Inverter 34 found in FIG. 2a.

FIG. 3 is a block diagram of a receiver capable of receiving the two-tiers of service.

FIG. 5b is a detailed block diagram of the NIM (Noise Enhancement Mitigation) module shown in FIG. 5a.

FIG. 9 is a detailed block diagram of the carrier control unit (CCU) unit found in FIG. 4.

FIG. 10 is a detailed block diagram of the symbol timing control unit (STCU) found in FIG. 4.

DETAILED DESCRIPTION

Figure 1:
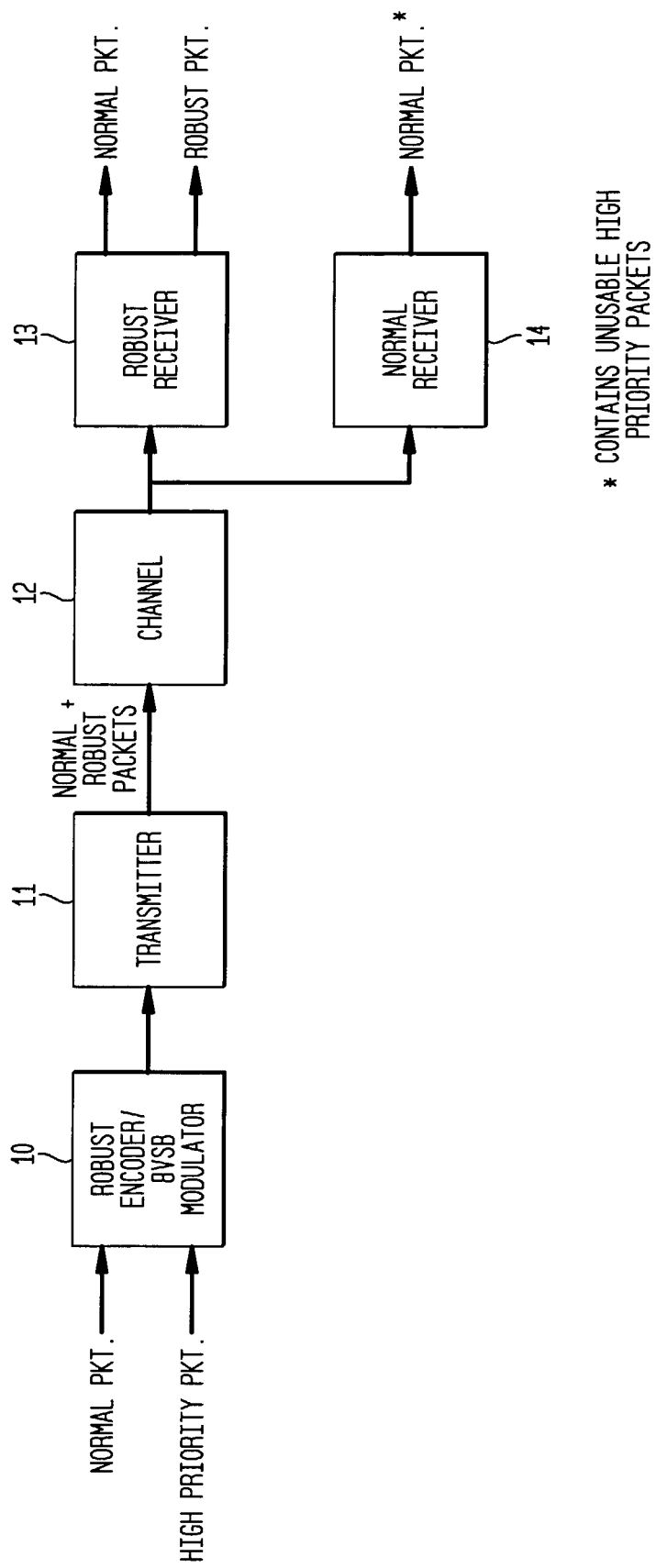
FIG. 1 is a block diagram of an ATSC hierarchical transmission system that produces a two-tier symbol stream according to the present invention.

FIG. 1 illustrates the ATSC hierarchical transmission system using the robust data mode. The packets that are to be encoded in a robust mode, are labeled high priority data packets and are merged with the normal packets of the system by robust encoder/8VSB modulator 10. The high priority data packets are assembled using NULL Packet Identifiers (PIDs) that are not valid for the normal packet stream. After processing, the signal is sent to transmitter 11.

Normal and robust data packets are broadcast through the transmission channel 12. Robust receiver 13 processes the received signal and produces two packet streams: the normal packet stream and the high priority stream. The robust receiver receives high priority data packets error free in adverse channel conditions in which the normal packets are unusable due to excessive errors. The normal receiver 14 produces a single packet stream of normal packets (if channel conditions are favorable enough to permit reception). Since the high priority data packets contain Packet Identifiers (PIDs) associated with NULL packets that are not valid for the normal packet stream, the high priority data packets will be discarded by the transport demux in the normal receiver 14, thereby maintaining backward compatibility.

Robust Encoder

Figure 2:
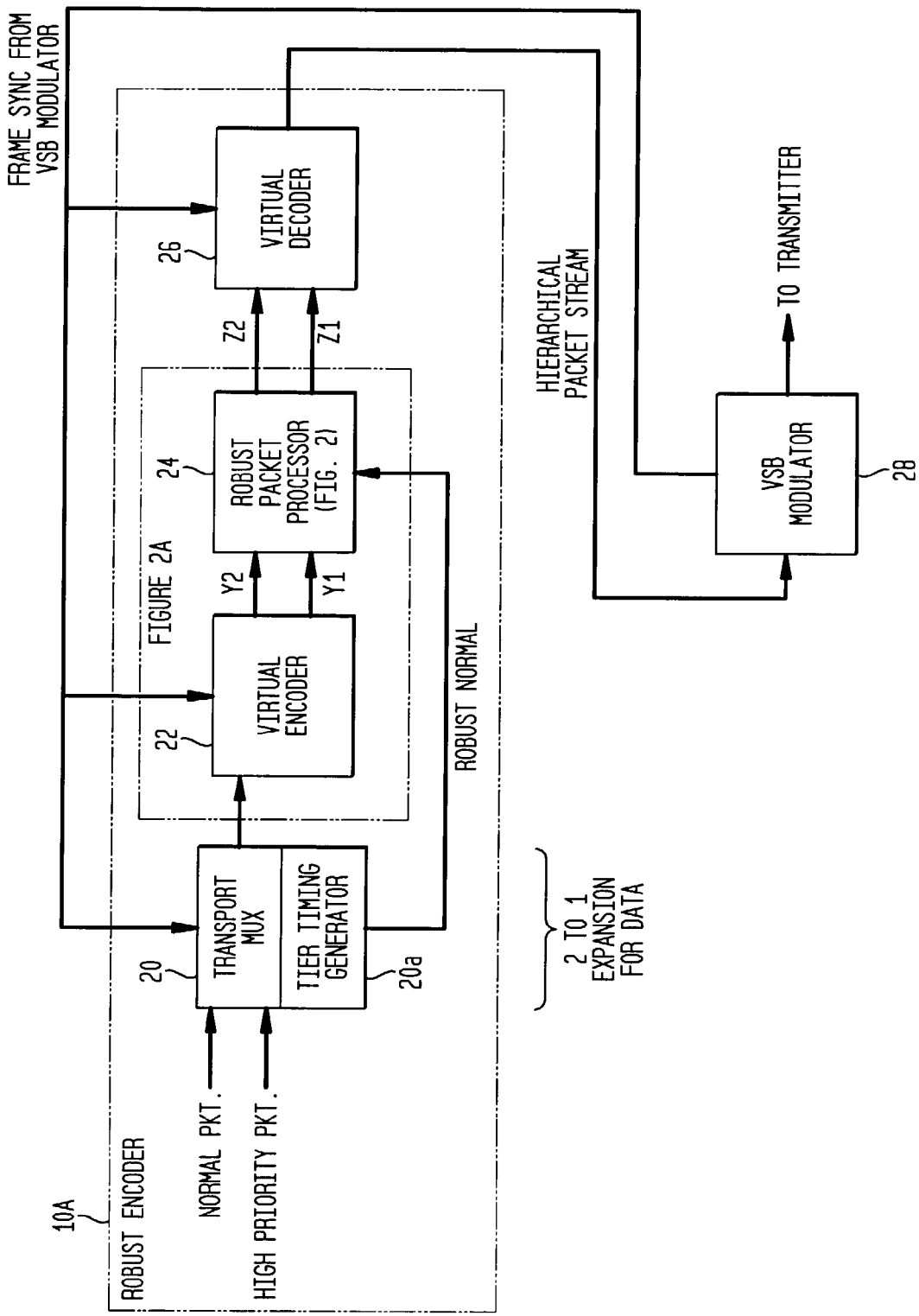
FIG. 2 is a detailed block diagram of the robust encoder and 8VSB modulator found in FIG. 1.

FIG. 2 is a block diagram of a robust encoder in accordance with the present invention. Normal MPEG 2 transport packets (labeled "Normal Pkt.") are multiplexed with the additional MPEG 2 transport data packets (labeled "High Priority Pkt.") in transport MUX/Tier Timing Generator 20. The additional data high priority data packets are encoded into a robust tier of service. Since robust data packets are encoded at a rate 1/3, zero filling every other bit position to occupy two transport packets not necessarily contiguous in time expands one data packet. In addition, tier timing generator 20a generates the Robust/Normal (N/R) signal, which synchronizes the insertion of the robust symbols into the symbol stream in the robust packet processor 24. Normal data is indicated by setting N/R=0, while robust data is indicated by setting N/R=1.

The percentage of the total available symbols for robust encoding can vary from 0 to 100%. However, the receiver must know what the percentage of robust packets so that the receiver can synchronize its own tier timing generator to the transmitter tier timing generator 20a. A robust mode tier control code is inserted into the reserved bit field of the ATSC signal. The receiver extracts the robust mode tier control code and uses the stored robust mode tier control code for synchronization. Since legacy receivers ignore the reserved bit field of the ATSC signal, backward compatibility is maintained.

A reasonable choice for the robust mode tier control code is to allow for 32 distinct modes, which is represented by 5 bits in the reserved field of the frame synchronization. In such case, robust mode=0 is defined as 0% robust data, while robust mode=31 is defined as 100% robust data. Between 0 and 100% robust data, the percentage of symbols available for robust data varies linearly with the robust mode tier control code. For example, when the robust mode tier control code is equal to 7, then 25% (8/32) of the available symbols are devoted to normal data and the remaining 75% of the available symbols are devoted to robust data. In addition, for each robust mode tier control value, the location and pattern of the robust data packets with respect to the normal data packets and the frame synchronization are predefined. Once the receiver has stored the robust mode tier control code, the receiver knows where to find each of the robust data packets in the received data stream, in accordance with the selected robust mode tier control code.

It is advantageous to add error correction coding to the 5 robust mode tier control bits in the reserved field to ensure that the tier control code is also robust and recovered error free. After multiplexing 20, the transport stream is encoded by a virtual encoder 22.

The robust encoder/8VSB modulator of FIG. 2 includes a virtual encoder 22 and a virtual decoder 26. A robust packet processor 24 processes the intermediate received data stream. The purpose of the virtual encoder 22 and virtual decoder 26 is to simulate the process that occurs within the existing VSB modulator 28. In such manner, the hierarchical packet stream can be input to the existing VSB modulator 28. Other than requiring access to the frame sync signal from the existing VSB modulator 28, no modifications are needed. In the future, a robust packet processor 24 may be incorporated within the VSB modulator 28.

The virtual encoder, robust packet processor 24 and virtual decoder 26 need not be three distinct processes but are illustrated in this fashion to show the steps necessary to ensure ATSC compliance. By definition the transport stream will be compliant since the (existing) ATSC compliant VSB modulator 28 will process it. The virtual encoder 22 is ATSC compliant and produces VSB symbols that are compliant as well. VSB Symbols are then modified by robust packet processor 24 and decoded by the virtual decoder 26. The output of the virtual decoder 26 contains the MPEG transport stream carrying the two-tiers of service. Frame sync from the existing VSB modulator 28 is used by the virtual decoder 26, the virtual encoder 22 and transport MUX/Tier timing generator 20 to synchronize the insertion of the robust data packets into the appropriate time slots.

Figure 2A:
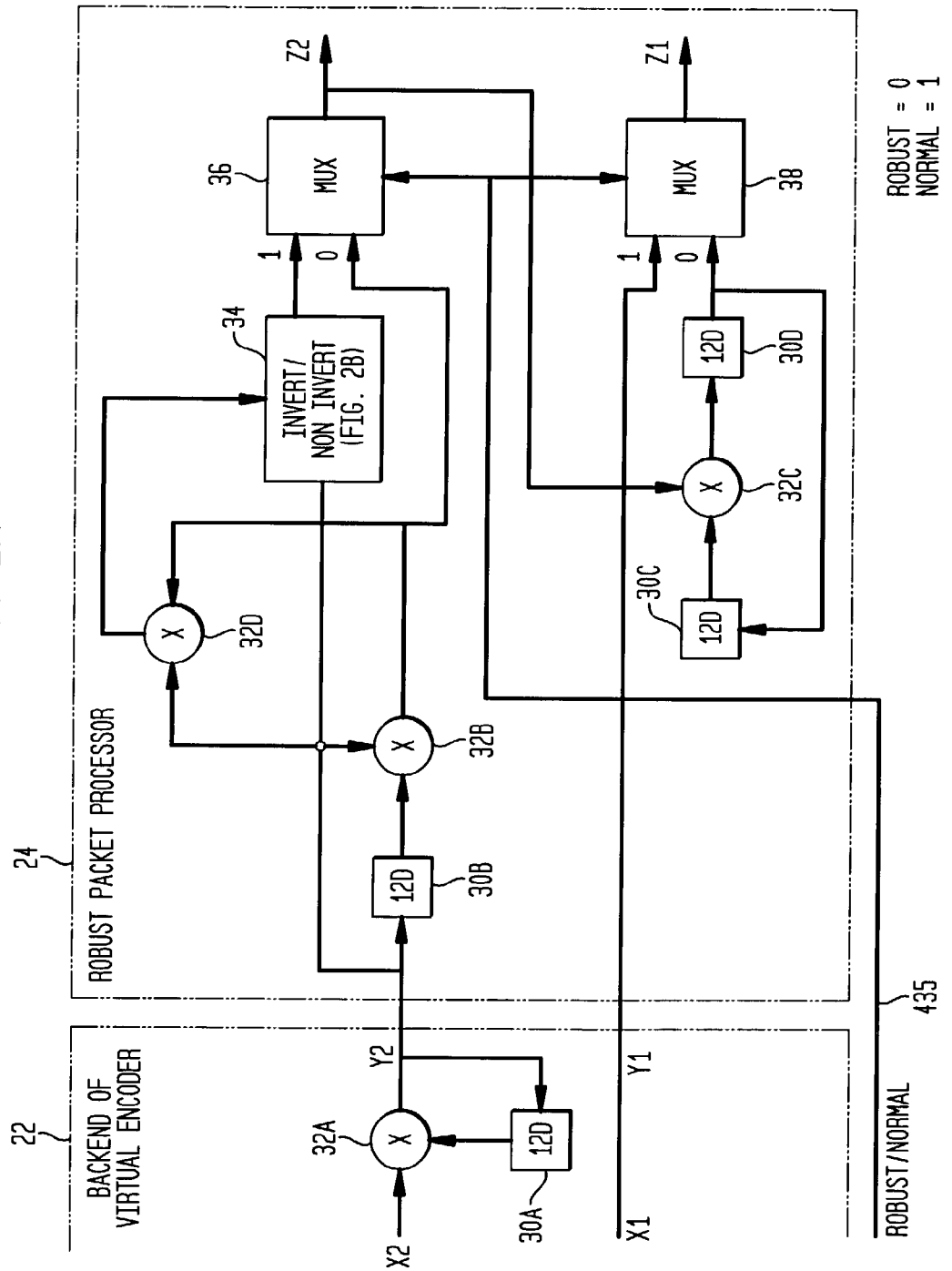
FIG. 2a is a detailed block diagram of the robust packet processor found in FIG. 2.

FIG. 2a is a detailed description of the backend of the virtual encoder 22 and the robust packet processor 24. In accordance with standard nomenclature, X1 and X2 are information data bits to be encoded, Z2, Z1 and Z0 are the trellis-encoded bits and Y2 and Y1 are intermediate bits created in digital signal processing.

The ATSC format provides for integral pre-coding of the X2 data bit. Integral pre-coding (a legacy of the ATSC format) was originally intended to deal with co-channel interference using a comb filter that has been made obsolete by the use of modern notch filtering techniques. It is desirable to defeat (i.e., undo or cancel) the integral pre-coder during the transmission of robust data packets. The robust packet is conditioning to defeat integral pre-coding by differentiating it. Since differentiation is the reverse operation of integration, the net effect is to cancel the effect of the integral pre-coder. If the integral pre-coder is not defeated during robust data transmission, and the integral pre-coder is allowed to randomly advance states, a performance loss of at least 1.25 dB occurs. Additional loss can occur since the integral pre-coding of the X2 stream doubles the effective bit error rate of the decoded X2 bit in the receiver. The advantage of defeating (undoing) the integral pre-coder during robust data transmission is that it produces a systematic trellis code.

As shown by FIG. 2a. the integral pre-coding of the x2 stream by exclusive or (XOR) 32a and delay 30a produces the Y2 stream in the virtual encoder 22. It is more convenient to modify the Y2 and Y1 data streams to produce Z2 and Z1 data streams. The first step of the robust packet processor 24 is to remove the effects of the integral pre-coding by differentiating the Y2 stream with delay 30b and XOR 32b. Multiplexer 36 selects the differentiated Y2 data from the "0" input in response to the Robust/Normal signal 435 asserted low. When high, the Y2 bit is selected from the "1" input to the multiplexer 36.

In effect, if a disparity exists between the differentiated Y2 and the Y2 bit at the time of resumption of normal symbol transmission, the Y2 bit is inverted in 34. The combination of XOR 32d controlling invert/non invert block 34 ensures that the polarity of the transmitted Z2 bit is correct when transitioning from a robust to a normal symbol. The inversion or non inversion of Y2 in element 34 ensures that the differential decoder in existing receivers works properly, ensuring backward compatibility.

Figure 2B:
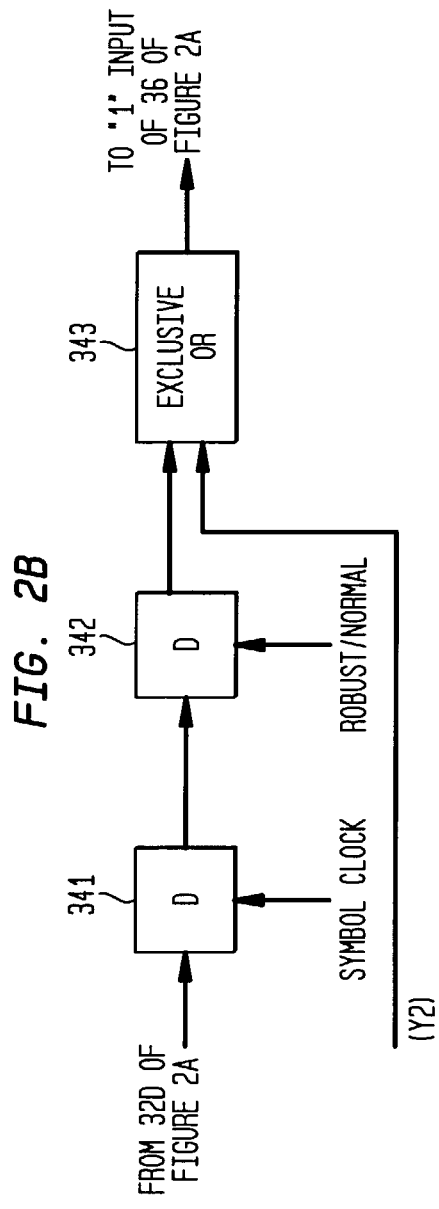

FIG. 2b is a detailed description of the invert/non-invert inversion process 34 of FIG. 2a. As indicted above, any disparity (detected by XOR 32d of FIG. 2a) between the differentiated Y2 and the Y2 bit at the time of transition from robust to normal symbol transmission is used in 34 to invert the transmitted Y2 bit. As shown in FIG. 2b, the output of XOR 32d from FIG. 2a is delayed one symbol clock by delay element 341 and then sampled by the Robust/Normal signal and held in delay 342. The signal held in delay 342 is then used to invert or not invert (Y2) in XOR 343. The output of XOR 343 is coupled to the "1" input of MUX 36 in FIG. 2a. Elements 341 and 342 in combination ensure that any disparity that occurs at the time of the last transmitted robust symbol is used to control the inversion or non-inversion of the subsequent normal symbols.

The non-pre-coded x2 is processed by the back to back combination of the virtual decoder 26 and the existing 8VSB encoder to produce the exact same Z2 data bits for the payload portion of the bit stream that was present at the output of the robust packet converter. The differences that still occur between the Z2 stream at the robust packet converter output and the existing VSB modulator output are caused by the normal Reed Solomon parity bytes that are generated for the robust data packets by the existing 8VSB encoder. The Reed Solomon parity bytes created by the virtual encoder are compliant with the zero filled packets whereas in the Reed Solomon bytes created by the existing encoder are compliant with the actual transmitted packet. Since the ATSC compliant Reed Solomon parity bytes are transmitted as normal data, the parity bytes are more prone to errors than the robust data message itself. The normal encoding of parity bytes for the robust packets requires that the robust data packets need their own forward error correction (FEC) parity bytes if they are to use a Reed Solomon correction code. In accordance with the present invention a robust data pre-processor adds the extra parity bytes for the robust data only. The additional parity bytes for robust data are encapsulated within the robust data payload. An example implementation of this robust data pre-processor is described herein below.

As previously noted, Virtual Encoder 22 in FIG. 2 predicts the symbol sequence that will actually be present at the VSB Modulator 28 output. One aspect of this prediction is to determine the states of the pre-coders in VSB Modulator 28, so that the integral pre-coding of the X2 data bit can be defeated for robust data. However, occasionally it is impossible to exactly predict these states since their states are dependent on ATSC parity bytes for robust packets that have not been computed, and cannot be computed at this point since the associated robust payload is still being computed.

Therefore, occasionally the integral pre-coder defeat circuitry needs ATSC parity bytes that have not been computed yet for the robust data packets. The net effect of this dilemma (parity bytes arriving before information bytes) is that worst case, occasionally (for about 1 in 40 robust symbols) the integral pre-coder advances state such that the transmitted robust data packets have the Z2 bit inverted (a phase inversion) relative to the Z1 and Z0 bits. In the latter case, the transmitted code is an inverted systematic code. The inversion of the Z2 bit is a phase ambiguity that must be resolved at the receiver.

Alternatively, the above-described phase ambiguity can be avoided at the transmitter by changing the existing Reed Solomon code and using a non-standard Reed Solomon code. Standard Reed Solomon encoders append the parity bytes to the end of the message. After interleaving, the parity bytes for a particular packet come out before all the information bytes have come out, creating the dilemma for defeating the integral pre-coder circuitry. In Reed Solomon encoding the parity bytes need not be placed at the end of the message in order to create a valid Reed Solomon codeword. However, changing the Reed Solomon code at the transmitter means that existing transmitting station will need to replace the existing 8VSB modulators. In that sense, changing the Reed Solomon code to a non-standard code is not fully backward compatible with the existing ATSC broadcasting equipment. Existing ATSC broadcasting equipment will continue to be compatible with existing receivers. However, to obtain the benefits of robust data transmission (robust data services and more stable normal data services) requires the replacement of the 8VSB modulator.

Therefore, both the legacy receivers expecting the parity bytes to be at the end of the message and the new receivers that know the true placement of the parity and information bytes, will see valid Reed Solomon codewords. In effect, the information bytes and parity bytes are scrambled, but (for the purpose of maintaining backwards compatibility) the legacy Reed Solomon decoders will still see these new codes as valid Reed Solomon code words. As previously indicated, the packet header in each robust data packet has been given a PID corresponding to a NULL packet. Therefore, it does not matter to legacy receivers that the information bytes have been scrambled because legacy receivers will in any event discard high priority data packets as NULL packets Using non-standard Reed Solomon encoding, the parity byte positions can be placed in the packet, such that after interleaving, all the information bytes come out first, and the Reed Solomon parity bytes, which have not yet been computed, can be calculated from the information bytes that previously come out. Now the Reed Solomon parity bytes can be calculated prior to the parity bytes being processed by the integral pre-coder circuitry, eliminating the phase ambiguity condition previously described. The receiver description for each of the two cases (where the phase ambiguity is resolved at the receiver or the phase ambiguity is resolved at the transmitter) is described in the sections below.

For robust symbol encoding, the Z2 data stream is then trellis encoded to produce the Z1 data stream as shown by delays 30c and 30d and XOR 32c in FIG. 2a. Multiplexer 38 selects between the trellis coded signal at the "0" input or the Y1 signal at the "1" input in response to the Robust/Normal signal. The illustrated trellis code is a 4-state convolutional feedback trellis code that is identical the ATSC trellis code that is used to generate the Z0 bit from the Z1 bit stream. At this point, the Z1 bit stream is a trellis-coded version of the Z2 bit stream. The effect of the virtual decoder 26 (of FIG. 2) on the Z2/Z1 bit streams is significant in respect to the randomizer. The ATSC compliant virtual decoder intentionally derandomizes the Z2 bit differently than the Z1 bit. The effect is to produce Z2/Z1 bit pairs at the existing VSB modulator input that have different randomization patterns applied to them. The randomization disparity between the two bits is removed by the randomizer in the existing VSB modulator, and hence, the Z2/Z1 pairs at the modulator output have had the randomization disparity between them removed, and are exactly the Z2/Z1 bit pair that was present at the Robust Packet Processor output.

The Z1 bit stream at the existing VSB modulator is further trellis encoded to produce the Z0 bit stream. The combined trellis encoder in the robust packet processor and the encoder in the existing VSB modulator form an effective 16 state trellis encoded sequence in which the substates (Z0 bit) are ATSC compliant.

The trellis encoder in the robust packet processor does not advance state when normal ATSC packets or robust parity bytes are being transmitted. The control muxes control whether normal 8VSB or robust symbols are being transmitted. The role of the invert/non-invert block preceding the mux for the Z2 bit inverts the polarity of the Y2 bit when the 8VSB symbol transmission resumes if a disparity exists between the Y2 and differentiated Y2 bit streams. This polarity inversion ensures that the Z2 bit stream is ATSC compliant when differential decoding is preformed on the normal ATSC symbols.

The trellis encoder illustrated was a 16-state trellis code. Trellis codes with more states can also be used. Also, multidimensional trellis codes can be used. In particular, a 4 dimensional trellis code may be well suited for this application since worst case placement of the robust symbols within the frame causes the 4 sub-states within the ATSC trellis to advance for significant periods of time while the super state is held because no robust symbols are being transmitted. Since the sub-state code (ATSC) is less reliable and the 16 state trellis decoder must use the sub-state estimates from the ATSC trellis code alone when normal transmission is occurring, the first symbols at the resumption of robust transmission are less reliable than subsequent symbols, a 4-dimensional code could strength the predictability of these first symbols.

The timing of robust symbol placement is indirectly controlled by the existing VSB modulator itself. The transport MUX inserts the unencoded robust packet synchronized to the VSB field sync signal. This ensures that the robust symbols are placed into known positions within the VSB frame. Different patterns and robust data rates are possible but in practice it should be limited to a finite number since the best way to convey to the receiver what the placement pattern was is through use of the reserve bits in the field sync segment. These bits should be coded to ensure reliable reception when operating under worst case communication channel conditions.

A robust data pre-processor (FIG. 2C) is provided to pre-process high priority data before application to the robust encode/8VSB modulator 10 of FIG. 1. As shown in FIG. 2 and described earlier, the robust encoder 10A multiplexes robust data packets (also called high priority data packets) and the normal packets in one stream. As described earlier, for the robust data packets, the Reed Solomon parity bytes are encoded as normal data (for backwards compatibility purposes) and therefore will have the significantly degraded reliability as compared to the information bytes (which are encoded as robust data). Another backward compatibility problem arises when using the robust data packets as MPEG packets, in that the resulting MPEG packet stream encoded for the VSB Modulator 28 may (with some non-zero probability) result in a valid MPEG packet header. False MPEG packets can destabilize the existing MPEG decoder. The MPEG packet header consists of 4 bytes, one byte of sync, and the other three bytes carrying Packet Identifier (PID) information. It would be desirable to ensure that the robust encoder does not cause valid MPEG packets corresponding to the robust data for existing MPEG decoders.

The robust data preprocessor solves both of the two backward compatibility problems described above (loss of Reed Solomon encoding and false MPEG packets). The main idea is to consider the robust data packet to be a smaller size than the MPEG data packet, add parity bytes to the robust data packet, and create a robust MPEG data packet. To ensure backward compatibility, the header bytes for the robust MPEG data packet are encoded with a NULL packet header and encoded as 'normal' data.

Figure 2C:
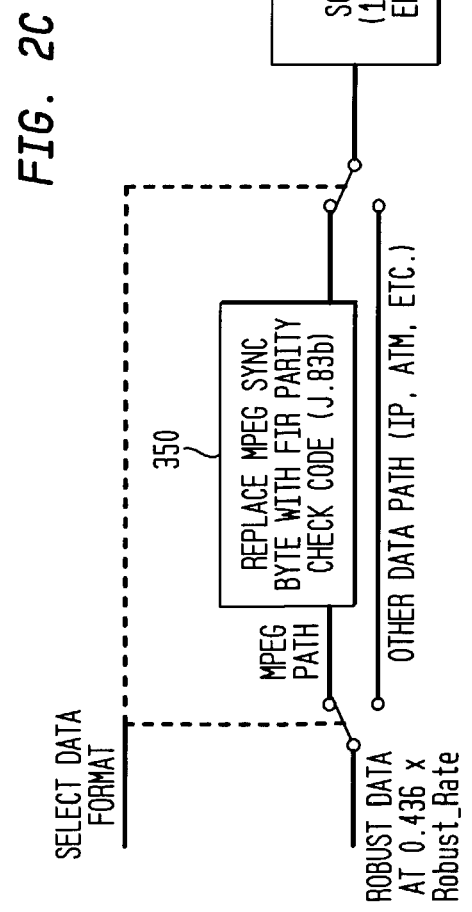
FIG. 2c is a block diagram of a robust data pre-processor in accordance with the present invention.

FIG. 2c illustrates a robust data preprocessor in more detail. The data preprocessor of FIG. 2c processes (or more accurately pre-processes) high priority data packets in FIG. 1 before the robust data packet is fed to the robust encoder/8VSB modulator 10. Since the robust data may be used for services other than those that result in MPEG packets (e.g. datacasting), an encoding facility for non-MPEG packets is also described. For robust data comprised of MPEG packets, the MPEG standard 47 hex sync byte is removed and replaced in 350 with an FIR parity check code as described in ITU J.83 Annex B. The parity check 350 added by the robust data preprocessor of FIG. 2c enables reliable MPEG packet sync detection at the receiver, as well as error detection in the MPEG packet. If the robust data is any other (non-MPEG) protocol, step 350 is bypassed. The information about whether the robust data consists of MPEG data or of some other protocol is sent to the receiver via a robust payload type information bit within the reserved bits of the VSB frame.

The next step within the robust data preprocessor is a (184,164) Reed Solomon encoder 352, which adds 20 Reed Solomon parity bytes to each 164 robust data bytes for a total of 184 bytes. The generator polynomial for the Reed Solomon encoder is the same as that used in the Reed Solomon (207,187) 8-VSB encoder (187 data bytes, 20 Reed Solomon parity bytes and 207 total bytes). The 184-byte Reed Solomon blocks are mapped into two 184-byte packets in step 354 as follows. Every byte is split into two segments of 4-bits each. With the 4 bits designated as A, B, C, and D, a new byte is generated by interspersing zero bits to create a byte: A, 0, B, 0, C, 0, D, 0. Thus each input byte is mapped into two output bytes doubling the data rate. Each 184 bytes output from the Reed Solomon encoder creates two 184-byte MPEG packet payloads. A 4-byte MPEG NULL packet header (includes the 47 hex sync byte) is attached to create a compliant MPEG Transport Stream packet at step 356. Legacy receivers ignore MPEG NULL packets, which is essential for backward-compatibility. The 4-byte MPEG NULL header is encoded as normal bytes (the 47 hex sync byte is removed by the VSB modulator). Setting N/R (Normal/Robust) flag as 0 (normal) for the 3-byte header ensures normal encoding for the MPEG header. Existing receivers will throw away the packets corresponding to the robust data, as they would decode the packet header as a NULL packet. The two robust data packets thus generated 354 could be allocated contiguously in a frame (or an even number of packets are allocated within a frame), so that the receiver can accumulate the two packets and implement the Reed Solomon decoding operation.

Since some of the robust data bytes need to be encoded as normal, the virtual encoder 22 must keep track of these bytes as shown in FIG. 2. The virtual encoder 22 includes a Data Randomizer, Reed Solomon encoder, Convolutional Interleaver and the Trellis Code Interleaver in accordance with provisional patent application Ser. No. 60/280,944, filed Apr. 2, 2001 (herein referred to as the A/53 specification). The A/53 specification is a proposal submitted to the Advanced Television Standards Committee, 1750K Street, Washington, D.C. 20035 US. The Data Randomizer is the ATSC randomizer, which operates on all bytes, and does not change the N/R signal, except to add delay to account for the latency of the block. The Reed Solomon encoder is the ATSC Reed Solomon (207,187) encoder, which keeps the N/R signal as provided by the Data Randomizer for information bytes. For all Reed Solomon parity bytes including the robust data MPEG packets, the N/R signal is set to normal mode. The Convolutional Interleaver keeps track of the N/R signal corresponding to every byte output by the Reed Solomon encoder by interleaving the N/R signal as well. The Trellis Code Interleaver output are 2-bit nibbles (X2,X1) and also keeps track of the N/R signal corresponding to every byte output by the convolutional interleaver.

The robust packet processor 24 as described earlier in FIG. 2A then operates on the incoming data, switching between normal and robust operation according to the Normal/Robust flag. The rest of the blocks comprise the virtual decoder 26 . The Trellis Code Deinterleaver outputs bytes to the Convolutional Deinterleaver, which performs the deinterleaving operation in accordance with the A/53 specification (provisional patent application Ser. No. 60/280, 944, filed Apr. 2, 2001). The Reed Solomon decoder simply removes the parity bytes for all input packets and the Derandomizer is the ATSC derandomizer.

Robust Decoder

The robust data decoder has a dual role. First, the robust data decoder is used to receive the robust data packets in channel conditions where the normal 8VSB symbols are not receivable, and second, the robust data decoder enhances the receivability of the normal 8VSB symbols. Both modes of operation (normal and robust) utilize the same decoding system. Differences in the processing steps for normal and robust modes are noted below.

The system multiplexes normal and robust modes by switching between robust data packets and normal data packets. FIG. 3c shows the state transitions of the trellis when hierarchical transmission is present. Intervals 610 and 614 are the state transitions when a robust symbol is transmitted (N/R=1) and interval 612 is the state transition when a normal symbol is transmitted (N/R=0). The darkened lines in interval 612 indicate the presence of parallel transitions.

FIG. 3 is a block diagram of a robust data receiver. The enhanced signal is processed by tuner 310, IF and SAW filters 312 in the normal manner. The demodulator/decoder 314 decodes the received symbols and demultiplexes them to produce a normal packet stream for digital television receiver 316 and a robust packet stream (previously referred to as the high priority data packet stream) for portable device 318. The data packet stream can be received in channel conditions in which the video packet stream is not receivable.

Figure 3A:
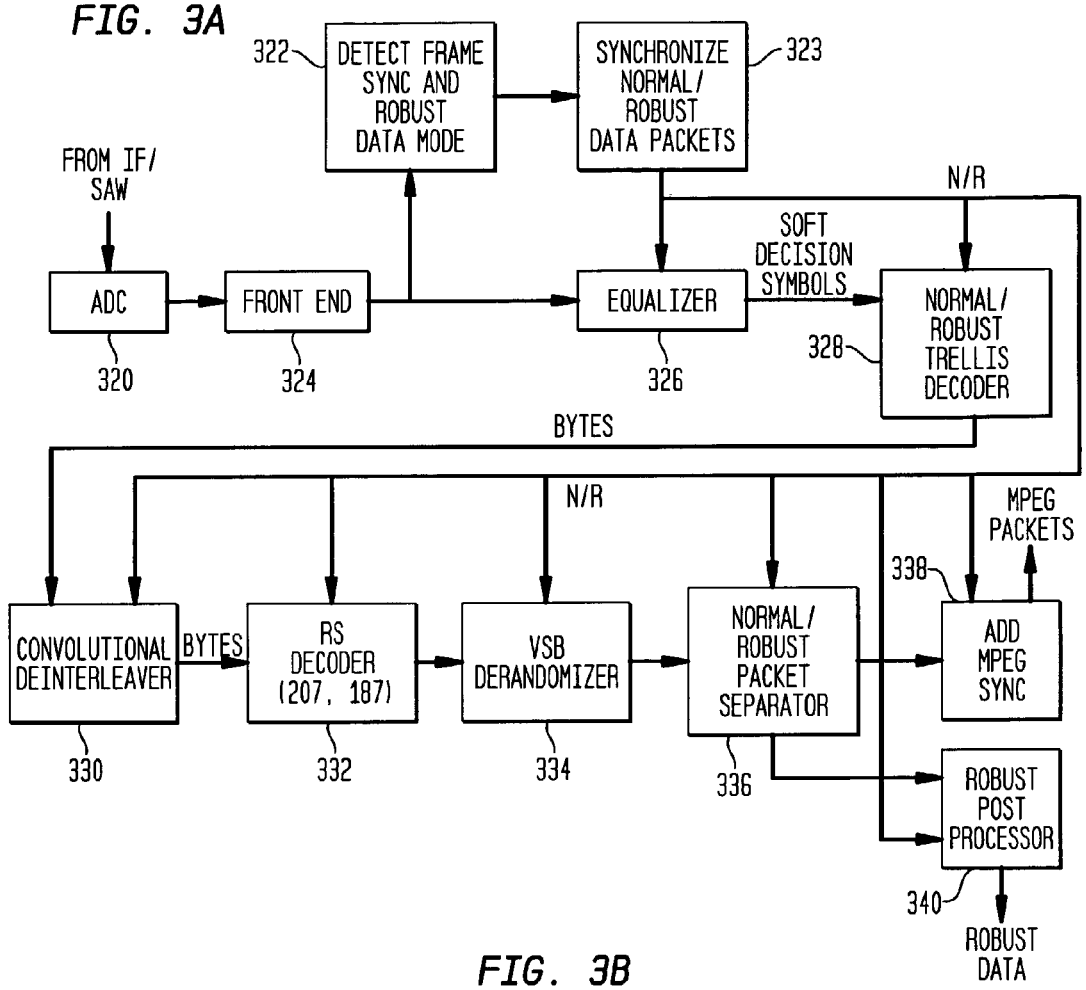
FIG. 3A is a detailed block diagram of the demodulator/decoder found in FIG. 3.

FIG. 3A is a detailed block diagram of the demodulator/decoder 314 in the receiver of FIG. 3. The enhanced VSB signal is digitized by an analog to digital converter 320. The VSB demodulator front-end 324 implements matched filtering, timing and pilot recovery. The front end 324 also provides AGC control to the tuner and IF gain amplifiers. The frame sync detector 322 synchronizes on the frame sync signal and receives the reserved bits from the frame sync representing the 5 bit robust mode tier control code. Having stored the robust mode tier control code, a complete map of VSB-symbols indicating whether each symbol is robust or normal is assembled 323. The resulting N/R signal, which specifies the positions of the robust symbols within the VSB frame and thus defines the transition between normal and robust mode, is made available from synchronization circuit 323 to all other receiver functions. The remainder of the receiver includes ATSC compliant convolution deinterleaver 330, Reed Solomon decoder 332 and VSB derandomizer 334. A normal/robust packet separator 336 separates normal data packets from the robust data packets. MPEG synchronization is added in 338 to robust MPEG packets. Finally a robust data post processor 340 at the receiver performs 184/164 Reed Solomon decoding, which is the reverse operation of the encoder provided by the robust data preprocessor of FIG. 2C located at the transmitting station.

The equalizer 326 is generally a DFE, i.e., a decision feedback equalizer. A DFE trains the equalizer 326 using the extra reliability of the robust symbols for difficult terrestrial channels. Note that the robust symbols provide an extra 5–6 dB of training margin. It outputs soft-decision symbols and an associated N/R signal to specify whether the symbol is a normal or a robust symbol.

Figure 3B:
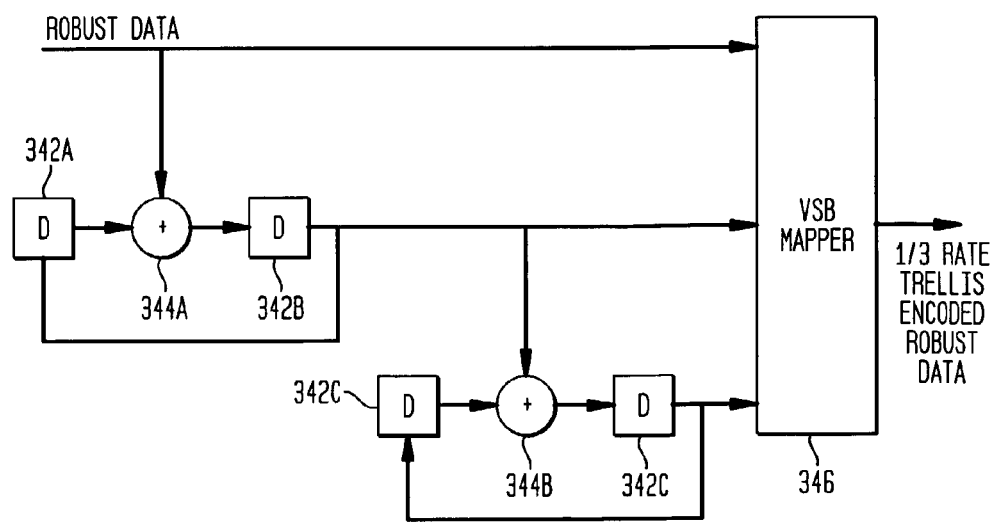
FIG. 3B is the block diagram of the effective trellis encoder assuming that all data is robust.
Figure 3C:
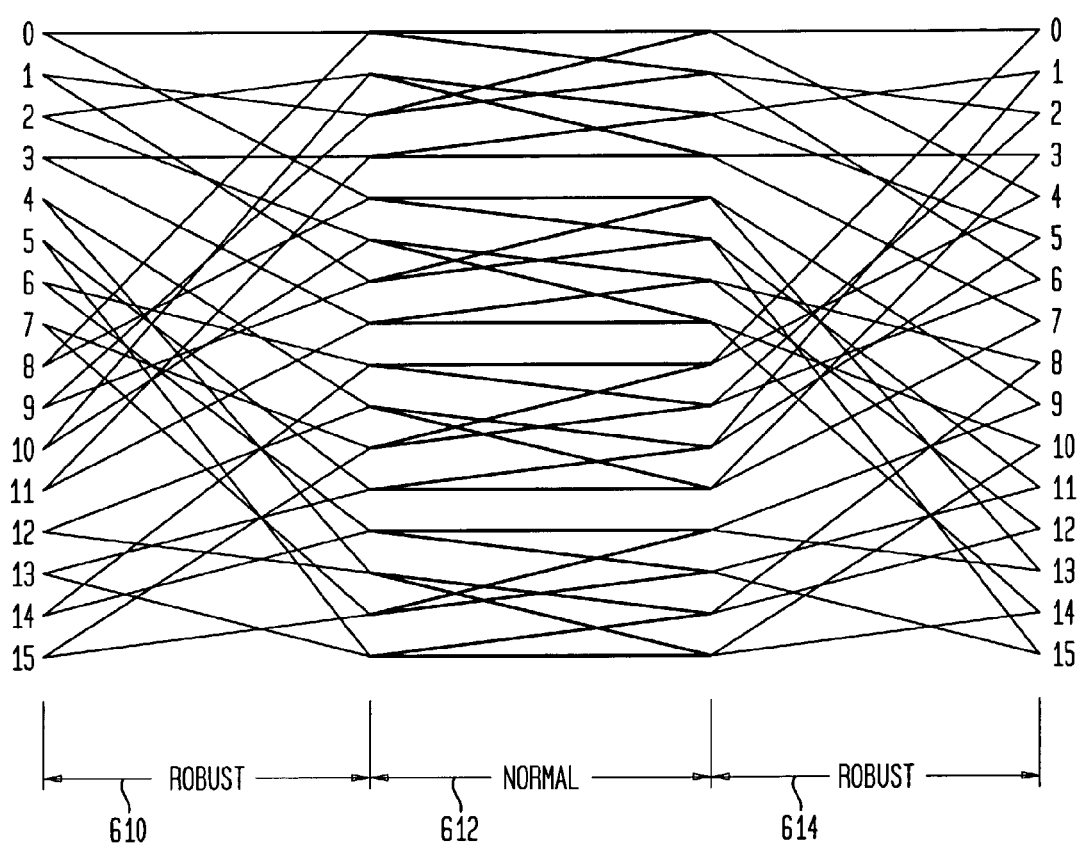
FIG. 3C shows the trellis state transition diagram when two-tier (robust/normal) service is being transmitted.

The Normal/Robust trellis decoder 328 is in accordance with the A/53 specification (provisional patent application Ser. No. 60/280,944, filed Apr. 2, 2001) for normal symbols. For the robust symbols, Normal/Robust trellis decoder 328 implements trellis decoding for the trellis code illustrated in FIG. 3B. As shown in FIG. 3B, robust data is encoded in first trellis encoder 342A, 344A and 342B. The output of the first trellis encoder is further encoded in a second trellis encoder 342C, 344B and 342C. Note that the trellis decoder gets interrupted as it switches back and forth between normal and robust symbols. An effective method to implement a trellis decoder for both cases is to carry 'parallel transitions' for the normal trellis within the scope of the robust trellis.

As described earlier, there is a phase ambiguity in the symbols corresponding to the Reed Solomon parity bytes for the robust data packets if a systematic Reed Solomon encoder is used. Note that this ambiguity would require making a decision between two possibilities for the symbol, which result in making a decision on one of two subsets. This decision can be made on either symbol by symbol basis or on a block basis.

If a non-standard Reed Solomon encoder is used in the transmitter, then there is no phase ambiguity. The non-standard Reed Solomon encoder does involve reordering of the information bytes, which must be reversed at the receiver. Since the reordering is based on the position of the packet within a frame, which is known uniquely at the receiver, the reordering can be reversed easily. However, as previously indicated, a non-standard Reed Solomon code would not be compatible with existing transmitters and thus would necessitate modification of existing transmitters.

The rest of the blocks in the diagram of the robust data receiver of FIG. 3A are the inverse of the blocks described for the encoder. The ATSC convolutional deinterleaver 334 performs the inverse of the ATSC convolutional interleaver, and keeps track of Normal/Robust flag. The Reed Solomon decoder 332 operates on the normal packets only.

The Reed Solomon decoder for the robust data packets are bypassed, i.e., parity bytes are stripped and only the information bytes are send (note if the non-standard Reed Solomon encoder is used, then a different byte reordering per packet within a frame is implemented before stripping the parity bytes). In the latter case, it provides the N/R signal for the VSB derandomizer, which operates on both the normal and robust bytes.

The output of the derandomizer is sent to the Normal/Robust packet separator 336, which first collects the normal and robust data packets in separate buffers. For normal packets, an sync is added 338 and sent as a normal MPEG packet. For robust bytes, first the three-byte header for every 187-byte packet is removed, resulting in 184 byte packets. Then two 184-byte packets are collapsed into one 184-byte packet according to the encoding described within the robust packet preprocessor. The resulting 184-byte packet is then sent to the robust postprocessor. The robust post-processor performs Reed Solomon (184,164) decoding. It also performs MPEG sync replacement if robust_payload_type indicates MPEG protocol.

Figure 4:
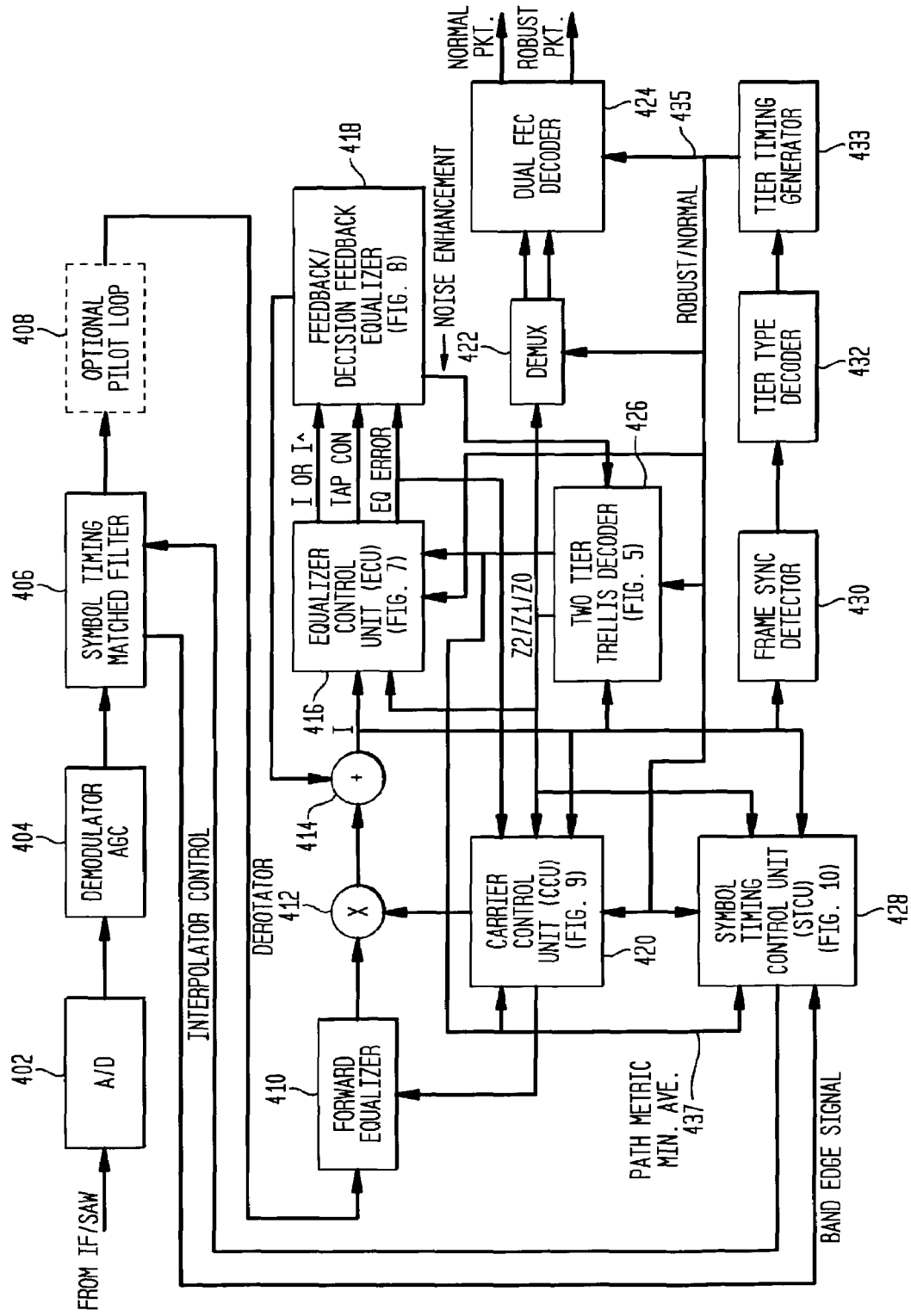
FIG. 4 is a detailed block diagram of the demodulator/decoder that includes the demodulation, symbol timing, equalization, carrier recovery and trellis decoding functions required to receive the two-tiers of service.

FIG. 4 is a detailed block diagram of the demodulator/decoding function (314 in FIG. 3). The VSB signal is digitized by A/D 402, AGC'd and demodulated by block 404, interpolated (timed) and matched filter in the usual fashion in block 406 without distinguishing between normal and robust symbols within the symbol stream. Additionally, an optional pilot recovery loop 408 can be used as in the usual fashion. After the optional pilot recovery 408, the two-tier (normal and robust) symbol stream is applied to linear forward equalizer 410. The output of the forward equalizer is derotated 412, and then summed 414 with the output of decision-feedback equalizer (DFE) 418. The adder 414 output is applied to a two-tier trellis decoder 426, frame sync detector 430 and equalizer control unit 416. The frame sync detector 430 operates in the usual manner by cross correlating the derotated I symbols with a known stored version of the training sequence. The frame sync detector 430 creates a signal that is used by tier type decoder 432 to extract the encoded control code from the reserved bit field. The encoded control code is then decoded (with error correction) to produce the robust mode tier control code. The robust mode tier control code is applied to tier timing generator 433. The timing generator 433 produces the appropriate Robust/Normal signal 435 which is applied to the two-tier trellis decoder 426, equalizer control unit 416, carrier control unit 420 and symbol timing control unit 428. The Robust/Normal signal 435 and conditions the demodulator/decoder to process the type of symbol (robust or normal) being received.

The derotated I symbol is also applied to the two-tier trellis decoder 426 (described below). The two-tier trellis decoder 426 produces an output signal, Path Metric Min. Ave. 437 that is indicative of the reliability of the early trellis decisions being produced by the trellis decoder. The Path Metric Min. Ave. 437 is utilized by the equalizer control unit 416 to dynamically control, on a symbol by symbol basis, the operation of the feedback/decision feedback equalizer 418 and forward equalizer. The two-tier trellis decoder 426 also produces a customary stream of symbol decisions labeled (Z2/Z1/Z0) that are utilized by the carrier, equalizer and symbol timing control units. Demux 422 demultiplexes the symbol decisions for further processing by a dual FEC decoder 424.

Decisions are of two types: decisions involving the robust symbols, which are inherently more reliable, and decisions involving the normal symbols which are not as reliable. The two levels of reliability (the two-tiers of service) are used advantageously by the carrier control, symbol timing control and the equalizer control units, described below, which is considered an aspect of the invention.

The two-tier trellis decoder 426 receives the robust/normal signal, which tells the decoder what state transition sequencing it should be using for that particular symbol. A second input signal, noise enhancement from DFE 418, tells the two-tier trellis decoder 426 what the level of noise is in the soft decision I signal. The noise enhancement signal is proportional to the noise enhancement. The generation of the noise enhancement signal is in the DFE 418 and its specific use in the two-tier trellis decoder 426 will be described in more detail below.

Demux 422 and the dual FEC decoder 424 perform the standard ATSC deinterleaving function, Reed Solomon error correction and derandomization functions. For normal packets, these functions are compliant with the ATSC standard. For robust data packets, these functions can be ATSC compliant but are not limited to ATSC compliancy except for the requirement that existing receivers must see valid Reed Solomon codewords.

The Equalizer Control Unit (ECU) 416 dynamically controls the operation of the Feedback/DFE 418 and the forward equalizer. The ECU 416 uses the two control signals Path Metric Min Ave. 437 and Robust/Normal 435 to determine how to control the equalizer depending upon channel conditions and symbol type. An aspect of the invention is the use of the two-tier service to control the equalizer. The ECU 416 receives the unquantized transmitted symbols and the two-tier trellis decoder's early estimates (quantized) of what the transmitted symbols were likely to be. The ECU 416 sends either the unquantized or quantized symbols to the DFE 418 input. The ECU 416 also determines whether CMA (constant modulus algorithm) or DD (decision directed) error terms are used for the equalizer coefficient updating. The ECU 416 further generates the tap control signal (TAP CON) for the DFE section of equalizer. The ECU is described in more detail later in connection with FIG. 7.

The Carrier Control Unit (CCU) 420 receives the same four signals as the ECU 416 and uses the two control signals to adjust the phase detector operation and the loop filter gain and bandwidth depending upon channel conditions and symbol type. An aspect of the invention is the use of the two-tier service to control the carrier recovery loop. The carrier control unit 420 uses I and I^ signals for carrier phase error estimation and is described below in connection with FIG. 9.

The symbol timing control unit (STCU) 428 receives the same signals as the CCU 420 and in addition it receives the band edge signals from the symbol timing/matched filter block 406. An aspect of the invention is the use of the two-tier service to control the symbol timing recovery loop. Depending upon channel conditions and symbol type, this block uses either bandedge, coarse decision directed or full decision directed timing recovery. The symbol timing control unit (STCU) 428 will be described in more detail in connection with FIG. 10.

Figure 5:
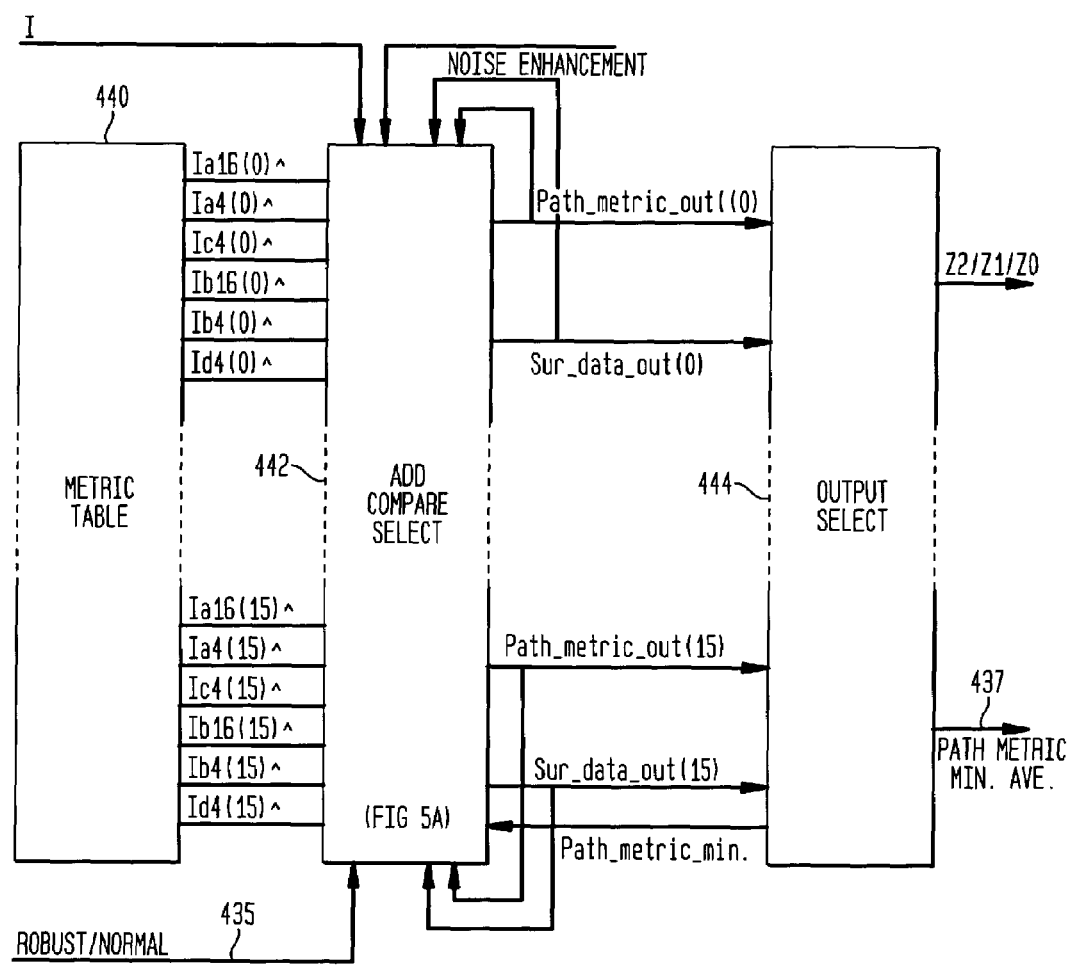
FIG. 5 is a block diagram of the Two-tier trellis decoder shown in FIG. 4 when non-standard Reed Solomon encoding is used in the 8VSB modulator.

FIG. 5 is a detailed block of the two-tier trellis decoder when non-standard Reed Solomon encoding is used and there are no phase inversions of the transmitted Z2 bit. Metric table 440 contains the various branch metrics to be utilized by add/compare/select unit 442. Output selector 444 selects the final Z2/Z1/Z0 bits to be utilized in the various blocks previously mentioned. The output select unit 444 operates in a known manner, selecting one of the 16 survivor paths to produce the Z2/Z1/Z0 output.

The notation used to describe the contents of the metric table is as follows. Consider the trellis diagram of FIG. 3 for the robust symbols only. The two branches that end in a particular state happen to be from one of two subsets: states 0–7 or states 8–15. These two subsets are referred to as 'a16' and 'b16' subsets (the index 16 referring to a 16-state code). The constellation point corresponding to each of the two branches that result from every state within states 0–7 for the a16 subset are numbered sequentially from 0 to 15 and referred to in the following as Ia16(i). Similarly for the b16 subset with Ib16(i), i=0 to 15.

For the normal trellis, each transition corresponds to two constellation points and is called as a parallel transition. The transitions for the 16-state expansion are actually four repeated sections of four-states each. Each such four-state section can be divided in two subsets, the top two states and the bottom two states. The constellation points corresponding to the parallel transitions for each of top two states are referred to as Ia4(i) and Ic4(i), for i=0 to 3, and for each of bottom two states are referred to as Ib4(i) and Id4(i), for i=0 to 3.

Figure 5A:
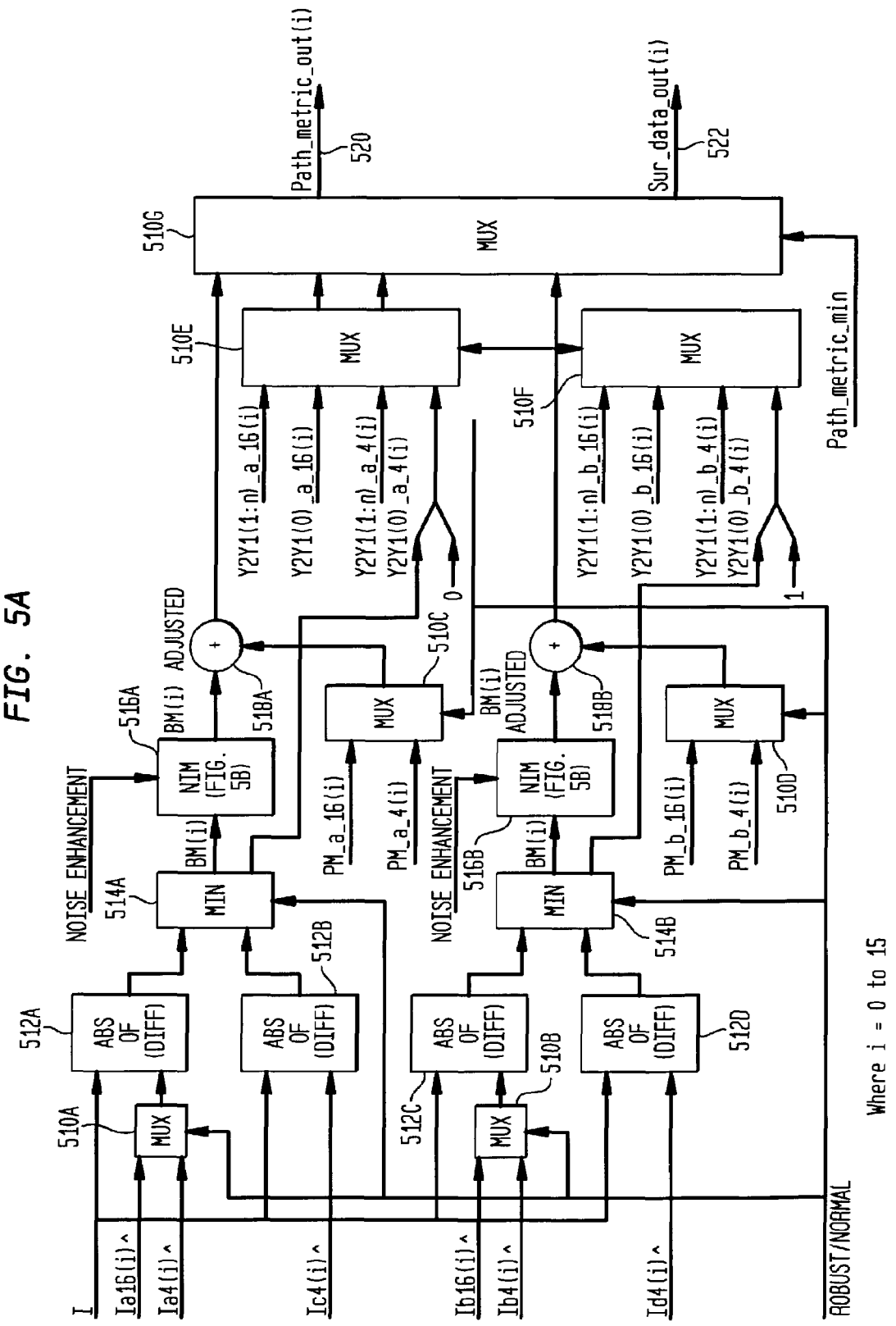
FIG. 5a is a detailed block diagram of the Add/Compare/Select unit found in FIG. 5.

FIG. 5a is a detailed block diagram of the ith add/compare/select (ACS) unit (442 in FIG. 5) that embodies aspects of the present invention. For a 16 state trellis code, 16 ACS units are present. The six MUXes 510a through 510f and the two "MIN" blocks 514a and 514b are controlled by the Robust/Normal signal.

When the robust/normal signal is low, indicating a robust symbol is being decoded, the top input of all the muxes 510a through 510f is being selected. The two "MIN" blocks 514a and 514b only select the absolute minimum of the two input signals when normal mode is selected. In robust mode, two branch metrics, |Ia16(i)^−I| and |Ib16(i)^−I| are generated in blocks 512a and 512c by creating the absolute value of the difference of the channel symbol I and the ideal value for that path. These branch metrics are then normalized for noise enhancement created by the IIR/DFE in NIM blocks 516a and 516b and converted to a Euclidean distance by the NIM block. The adjusted branch metrics are them summed in 518a and 518b with corresponding path metrics for that particular state transition. The Selector 510g selects the minimum of the two resulting path metrics to generate the most likely path for that particular state. The corresponding survivor sequence is selected in tandem with the path metric selection. The method of survivor path selection is known as the "Direct Register Exchange Method" and it is further known that there are more hardware efficient ways to select the survivor sequence using traceback techniques. The functional behavior of both methods is exactly the same.

Not shown, but known to those skilled in the art, is the generation of the Path_metric_min function, which is the minimum of the survivor paths and its subtraction from all the path metric values in selector 510*g* to perform the normalization function. The selector produces two output signals for that particular state, the minimum path metric (Path_metric_out(I) (520)) and the associated survivor data (Sur_data_out(I) (522)) which are fed back to the ACS inputs in a known fashion. The trellis decoder is constructed such that an "a" path is the result of the information bit (Y2 for robust symbols) being a zero and conversely selection of the "b" path input is the result of the information bit being a one. As shown in FIG. 5A, the MUXes 510*e*, 510*f* preceding the selector 510*g* select Y2Y1 bit pairs, instead of a single bit Y2. For robust data packets the Y2 bit must be predicted, and for normal packets the Y1 bit must be predicted.

The operation of the two-tier trellis decoder (426 in FIG. 4) normal mode is a somewhat more complex since it must account for parallel paths. When Robust/Normal is high, all the lower inputs of the absolute value of the difference blocks 512*a* through 512*d* are selected and the "MIN" blocks are performing the minimum function. In this case, the "MIN" blocks select between the two branch metrics created as a result of the parallel paths that result from the uncoded Z2 bit. The top "MIN" block selects between branch metrics generated from ideal values Ia4^ and Ic4^ and the bottom "MIN" block selects between branch metrics generated from ideal values Ib4^ and Id4^.

The two estimates of the uncoded Y2 from these decisions are sent to MUXes 510*e* and 510*f* where they are merged with the predicted Y1 bit from the trellis decoder. In normal mode the Y1 bit is predicted to be a 0 for selection of "a" path metrics and to be a 1 for "b" path metrics. In robust mode the Y2 bit is predicted from the trellis decoder and the Y1 bit is a "don't care". The previous surviving estimates of Y2 and Y1 are indicated by the Y2Y1(1:n) inputs to the MUXes. Depending on the mode selected, the "wiring" of the trellis changes between normal and robust mode as indicated by FIG. 3. The normal mode state advancement of the upper trellis states does not occur and the transitions are confined to the sub-states of the ATSC trellis. The branches for the normal mode are represented by thicker lines to indicate that there are two parallel transitions per state. Although not shown in the FIGS. 4, 5 and 5A, in addition to predicting the Y2 and Y1 bits, the associated symbols with those transmitted symbols can be predicted to create a stream of estimated symbols. Also not shown in the FIGS. 4, 5 and 5A, is the final output of the two tier trellis decoder that selects one of the surviving sequences based upon the current path metric that has the minimum absolute value. The selected survivor Y2Y1 sequence is sent to the deinterleaver and the most recent symbol in the selected survivor symbol sequence is the current symbol estimate I^ and it is sent to the various blocks as previously noted.

For receiver blocks that use past symbol estimates as well (carrier recovery, symbol timing and DFE), sending the two tier trellis decoder current estimate of previous symbols sent yields a performance increase over using the past estimates of past symbols. In this case, the trellis decoder output for each symbol instance is a group of symbols, the current estimate of the current symbol and past successive N symbols. This type of symbol updating is known in the art and is well described in U.S. Pat. No. 5,757,855. However, in practice, moving large blocks of symbols in this way is difficult to implement and typically, the block length N is kept short.

Instead of maintaining two distinct survivor chains per state, Y2Y1 and the associated symbol, these two chains can be combined into one chain by predicting the Z2, Z1 and Z0 bits for each transmission mode. The transmitted information bits and the symbols can be derived from these bits in a straight forward way as described in the ATSC Digital Television Standard. Table 1 illustrates how to estimate these bits for both transmission modes.

Figure 6:
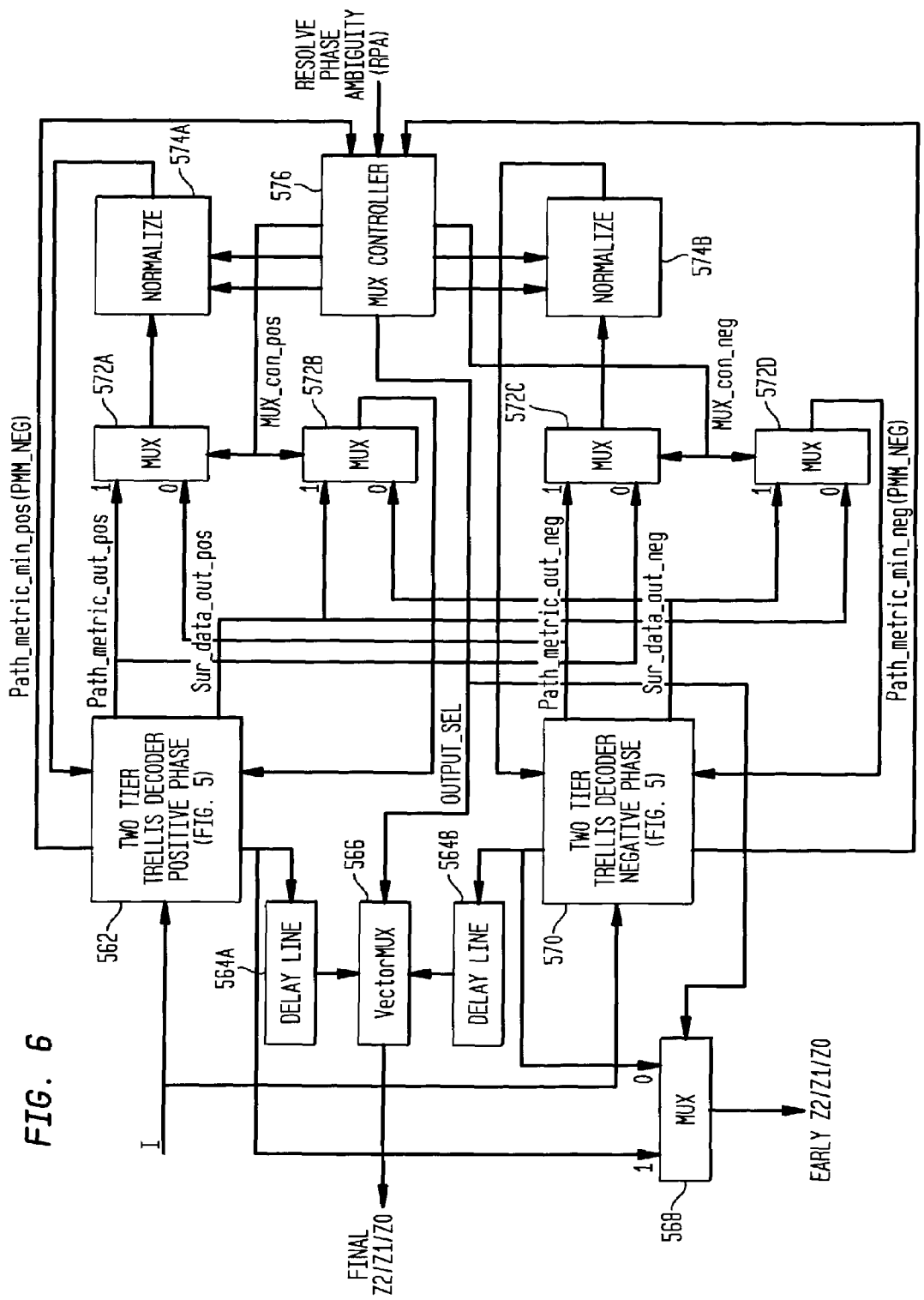
FIG. 6 is a block diagram of a Dual Phase Two-tier trellis decoder for us in conjunction with the demodulator/decoder of FIG. 4 when standard Reed Solomon Reed Solomon encoding is used in the 8VSB modulator.

FIG. 6 is a detailed block diagram of a dual phase two-tier trellis decoder when standard Reed Solomon encoding is used and there are occasional phase inversions of the transmitted Z2 bit in the transmitted signal. Although the polarity of phase inversions is not known, when the position of a possible phase inversion is known, which can be used to resolve the phase ambiguities. The dual phase two tier trellis decoder consists of 2 two-tier trellis decoders, a positive phase two tier trellis decoder 562 and a negative phase two tier trellis decoder 570. The positive phase two tier trellis decoder 562 assumes that there was no phase inversions of the Z2 bit and uses the same metrics contained in Metric Table 440 of the single phase two tier trellis decoder (FIGS. 5, 5A). The negative phase two tier trellis decoder assumes that there was a phase inversion and uses a Metric Table assuming the Z2 is inverted relative to the coded bits Z1 and Z0. Both positive and negative phase decoders 562, 570 are each similar to the single phase two tier trellis decoder except that the Path_metric_out signals and the Sur_data out signals, normally internal to the decoders, are processed by MUXes 572*a* through 572*d* and normalizers 574*a* and 574*b* and then fed back into the decoders. Also, the Path_metric_min signal is generated external to decoders. During normal operation, these signals are fed back to their respective decoders without alteration, and hence the decoders are operating independently. The Path metrics for positive and negative phase operation are allowed to accumulate. MUX controller 567 controls the operation of the MUXes 572*a* through 572*d* and the normalizers 574*a* and 574*b*.

However, when the Resolve Phase Ambiguity (RPA) signal is asserted high, the MUX controller 576 compares the Path_metric_min_pos (PMM_POS) signal with the Path_metric_min_neg (PMM_NEG). The Sur_data associated with the trellis decoder with the lower accumulated minimum path metric is fed back to both decoders 562, 570. Similiarly, the path_metric_out signals associated with the lower path metric are normalized 574*a*, 574*b* and fed back to both decoders 562, 570. The RPA signal is derived in the tier timing generator (433 in FIG. 4) and should be asserted just prior to possible phase inversions in the signal to ensure that the previous phase inversion is resolved prior to resolving the succeeding one. Employing four parallel trellis decoders would enable two phase inversions to be resolved between assertions of the RPA signal. MUX 566 selects the early decision Z2/Z1/Z0 bits associated with the lessor of PMM_POS and PMM_NEG for the ECU, CCU and STCU. Similarly, buffers 564*a* and 564*b* store the final decisions for the Z2/Z1/Z0 bits for the positive and negative decoders respectively. Again, upon assertion of RPA, the MUX controller selects the final decisions for the Z2/Z1/Z0 bits by controlling MUX 566 with the OUPUT_SEL signal from the MUX controller 576.

Figure 5B:
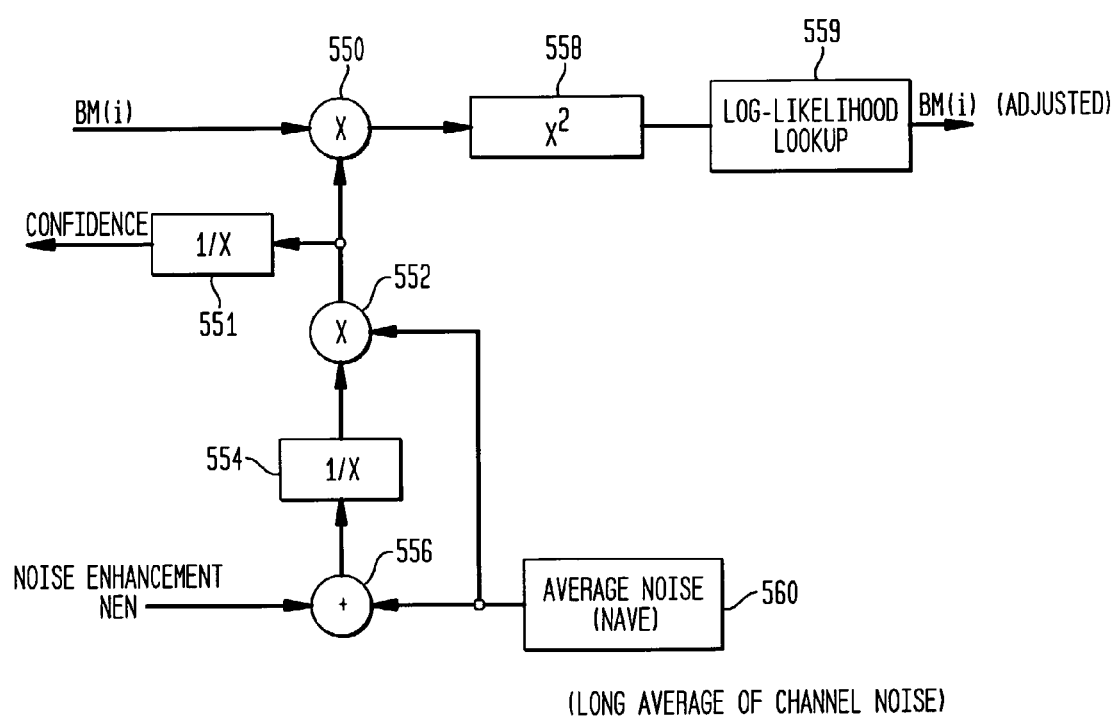

FIG. 5b is a detailed block diagram of the "Noise Enhancement Mitigation" circuit. Each selected branch metric BM(I) is multiplied 550 by a scaling factor that is proportional to the confidence in the received symbol at that time. This confidence measure is derived by taking the Noise Enhancement signal (NEN), adding the average channel noise level (NAVE) 560 to it in adder 556 and then performing an inverse function (1/X) in 554, and then multiplying that result in 552 with NAVE as shown in the Figure. The product of BM(I) and the scaling factor is squared 558 and sent through a log-likelihood lookup table 559 to produce the BM(I) adjusted signal. The log-likelihood function 559, which is well known, performs an optimal mapping for a specific signal to noise ratio (SNR). The NAVE signal is relatively constant from symbol to symbol whereas the NEN signal changes on a symbol to symbol basis. The effect is to leave the BM(I) signal unmodified when there is no noise enhancement and to reduce it when there is noise enhancement associated with that symbol. The reduction of the BM(I) signal value has the effect of reducing its impact on the trellis decoding process. The derivation of the noise enhancement signal is covered in the description of the DFE.

Figure 7:
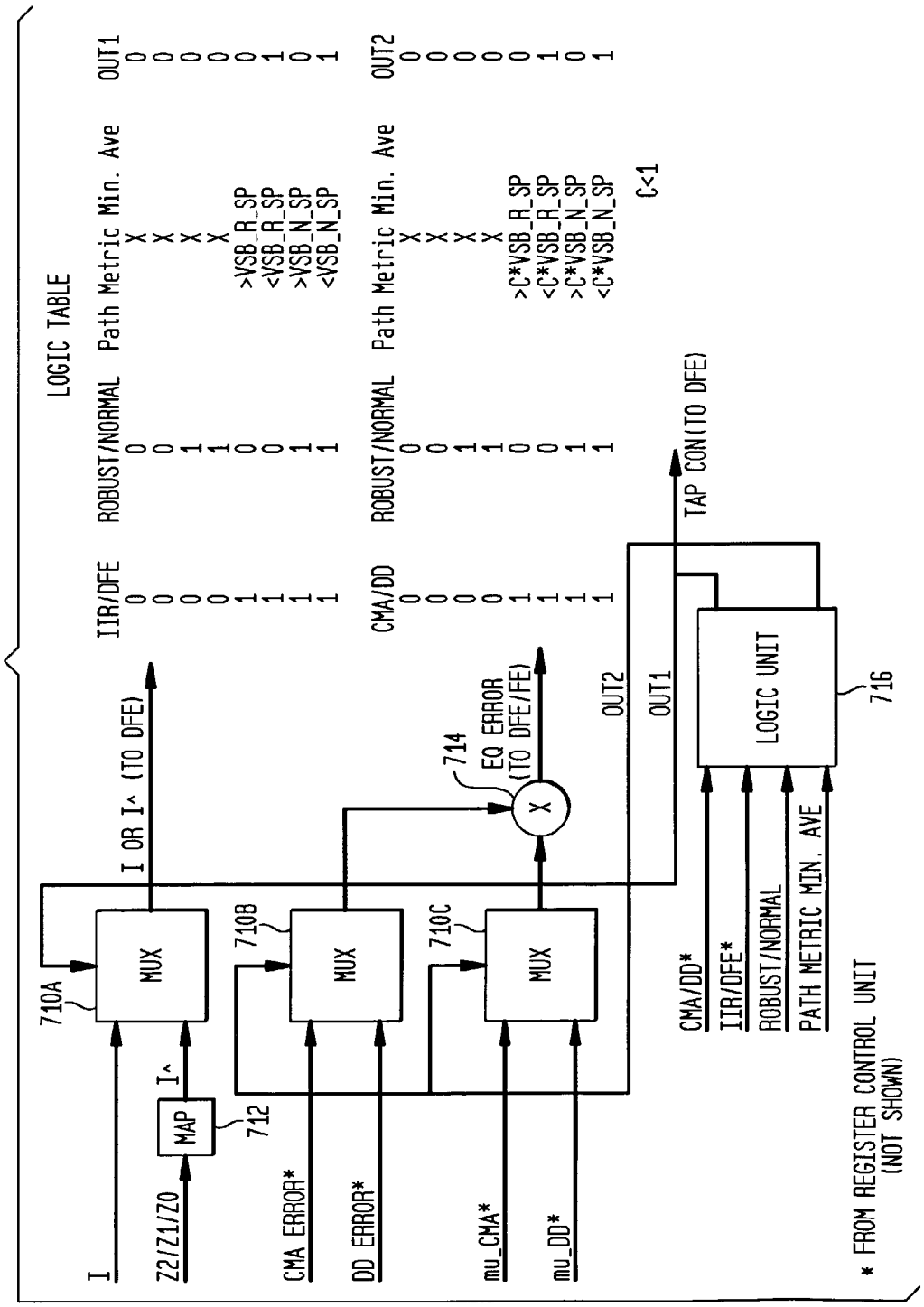
FIG. 7 is a detailed block diagram of the Equalizer Control Unit (ECU) shown in FIG. 4.

The detailed operation of the ECU is depicted in FIG. 7. The input MUX 710a selects between I and Î and therefore determines whether the equalizer is being operated in IIR or DFE mode for that particular symbol. Mapper 712 maps the Z2/Z1/Z0 bits into a corresponding symbol in compliance with the ATSC format. Logic Unit 716 controls the operation of the MUXes. The logic table for OUT1 indicates the control of this MUX. During initial acquisition, signal CMA/DD is 0 and the equalizer is forced to operate in IIR mode. When this signal is 1 (tracking mode), the input for the DFE is based upon whether Path Metric Min. Ave. is below a certain threshold: VSB_R_SP for robust symbols and VSB_N_SP for normal symbols. The robust threshold is higher than the normal threshold indicating the robust symbols can tolerate higher noise and residual ISI levels and still be considered reliable decisions. Out1 also becomes the tap control signal that is used in the calculation of the noise enhancement signal. MUXes 710b and 710c control what error criteria is applied to the equalizer (CMA error or DD error) and which mu (mu CMA or mu DD) is to be associated with that error term. Multiplier 714 scales the selected error term by the selected mu. The logic table for OUT2 indicates the control of these two MUXes. The switching threshold for these signals is generally lower than for OUT1 as shown by C being less than 1, indicating that it is desirable to keep the equalizer error term as CMA error even though the symbol input was a decision. This advantage has been determined through real world practice. A novel aspect of this invention is its operation in channel conditions where the robust symbols are received reliably and the normal symbols are not, i.e. when VSB_R_SP<path metric min ave.<VSB_N_SP. In this condition, the equalizer is stabilized by the constant yet random insertion of correct symbols into the DFE.

Figure 8:
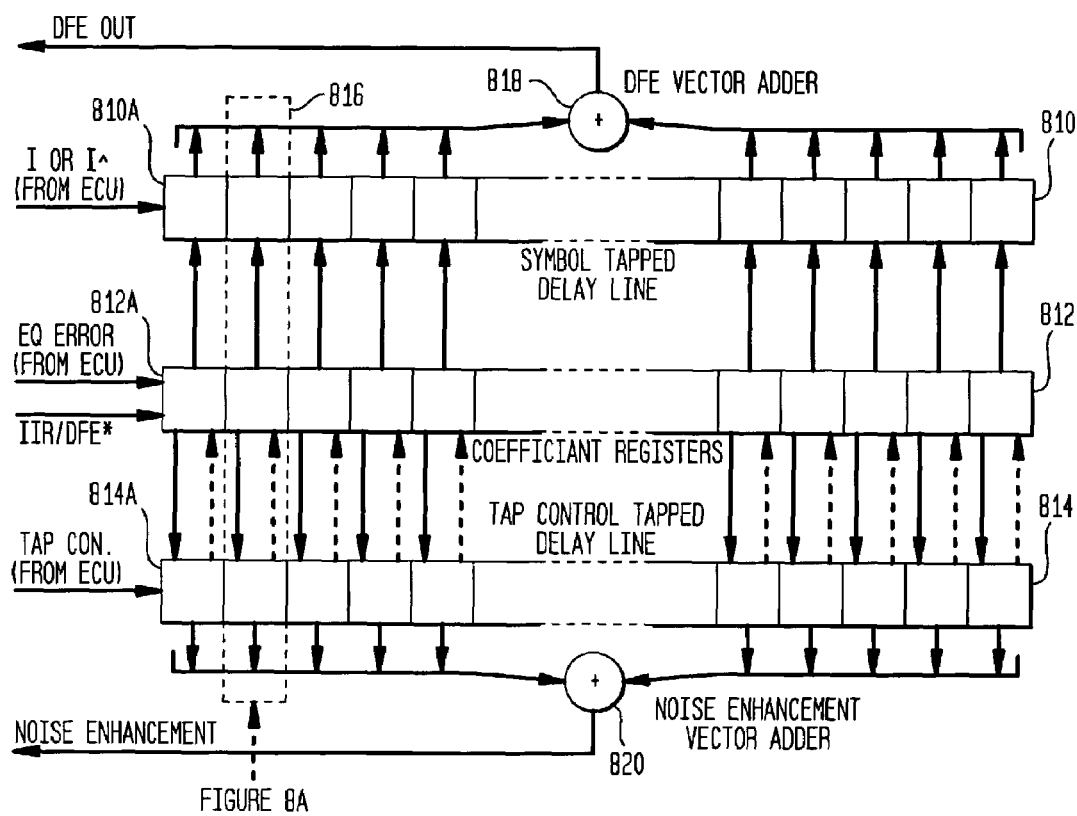
FIG. 8 is a block diagram of the Decision Feedback Equalizer (DFE) portion of the equalizer found in FIG. 4.

The detailed operation of the Decision Feedback Equalizer is shown in FIG. 8. The operation of this DFE differs from those typically found in that it has a "tap control" tapped delay line 814 to control coefficient updating of the coefficients 812 on a coefficient by coefficient basis and to form the basis of the Noise Enhancement signal in the trellis decoder. Elements 814a and 812a are single taps of the tap control tapped delay line and the coefficients 812 respectively. As has been previously described, once the IIR/DFE signal has been switched to DFE mode, quantized symbols are sent into the symbol tapped delay line 810 if the Path metric min ave. signal for that particular type of symbol (robust or normal) is below a threshold. Element 810a is a single tap of 810. The DFE output is created by vector adder 818 and summed with the derotated forward equalizer output (not shown). The Noise Enhancement signal is created by vector adder 820 and utilized by the Two-tier Trellis Decoder (not shown). During this mode of operation, it is desirable to update the coefficients only with symbols that have a high probability of being accurate. The tap control signal at each tap position is a one if the symbol at that tap is a quantized symbol with a high reliability of being correct and it is zero if the symbol is an unquantized channel symbol that we could not reliably predict. The coefficients converge to a more optimum open setting if they are only updated with reliable quantized symbols. A single tap position of the decision feedback equalizer is illustrated in 816 and will be described in further detail in FIG. 8a.

Figure 8A:
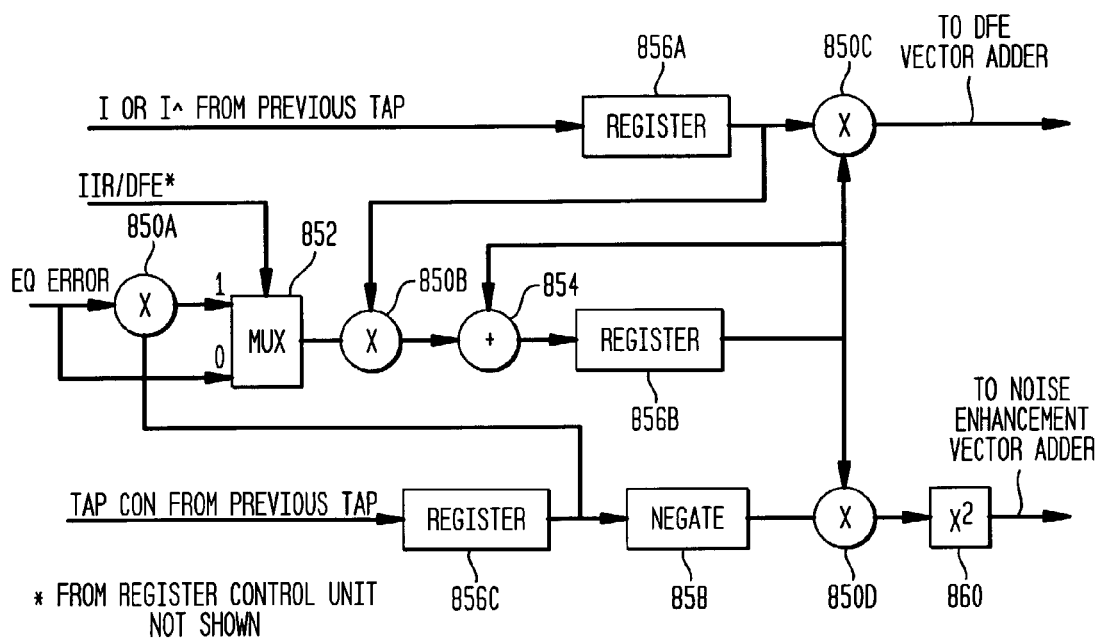
FIG. 8a is a detailed block diagram of a single tap of the DFE equalizer found in FIG. 8 that utilizes a first method of coefficient updating and a first method of computing the noise enhancement signal.

FIG. 8a is a detailed block diagram of each tap position utilizing a first method of coefficient updating and the Noise Enhancement (NEN) signal. When operating in IIR mode, MUX 852 selects the "0" input and the coefficient is updated by multiplier 850b adder 854 and register 856b in a known fashion. When operating in DFE mode, if the tap control signal from the previous tap is 1, coefficient updating is enabled by allowing the EQ error signal to pass through multiplier 850a without modification. If the signal is zero, the EQ error signal is made equal to zero by the multiplier, and the coefficient is held at its current value. Not shown, but known to those skilled in the art, the EQ error signal is scaled by mu (μ), the equalizer adaptation step size. Registers 856a and 850c form the output for the vector adder at that particular tap position. Register 856c, negator 858, multiplier 850d and squarer 860 produce a noise enhancement for that tap position. The noise enhancement of the DFE can be calculated by adding all these squared values in vector adder 820 (not shown). The noise enhancement control signal is created in negator 850d by negating (or inverting) the tap control signal and using this negated signal to determine whether the coefficient at that tap position is squared and then sent to the vector adder. This control of the EQ error helps the equalizer to converge more reliably than uncontrolled updating and is an aspect of the invention.

Figure 8B:
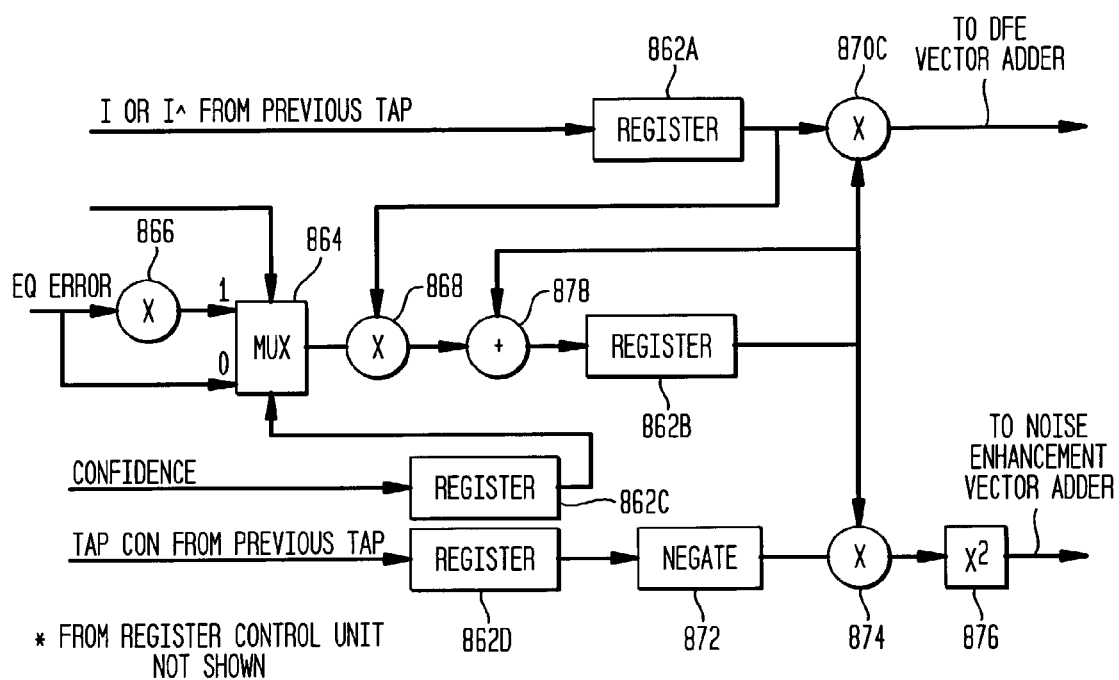
FIG. 8b is a detailed block diagram of a single tap of the DFE equalizer found in FIG. 8 that utilizes a second method of coefficient updating.

FIG. 8b is a detailed block diagram of each tap position utilizing a second method of coefficient updating. This method is similar to the first method except that the Confidence signal (from the inverse function 1/x in 551 of FIG. 5b) is used to scale EQ error signal. In the first method, in DFE mode, the coefficient was only updated if Tap con at that tap position was a one, indicating that the symbol at that position was a decision. In the second method, the coefficient is continuously updated with a scaled version of the EQ error. When the Confidence signal is large in value, indicating that there is high confidence in the symbol (I or Î) at that position, the EQ error is increased for coefficient updating at that position, and conversely, when the confidence signal is low in value, the EQ error is decreased for coefficient updating. This scaling of the EQ error helps the equalizer to converge more reliably than unscaled updating and is another aspect of the invention.

Figure 8C:
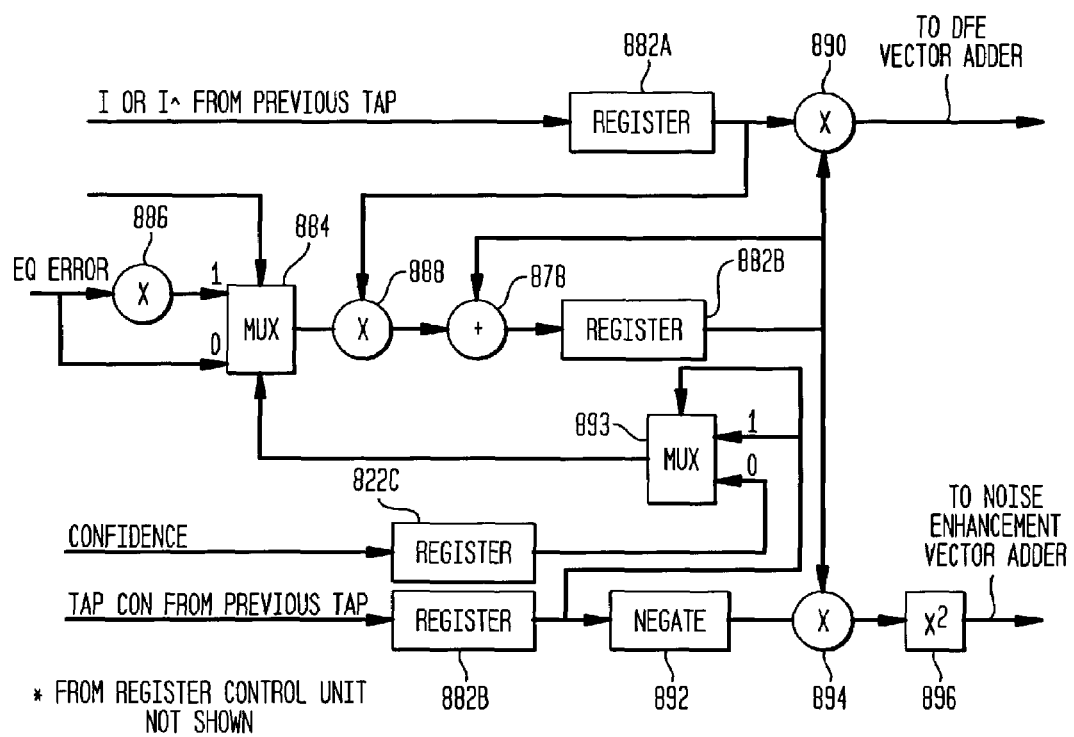
FIG. 8c is a detailed block diagram of a single tap of the DFE equalizer found in FIG. 8 that utilizes a third method of coefficient updating.

FIG. 8c is a detailed block diagram of each tap position utilizing a third method of coefficient updating. In the third method, MUX 893 is used to control the scale factor that is applied to the EQ error. When the Tap Con signal is a 1, indicating the current symbol is a decision (Î), the EQ error is unscaled, by selecting the "1" input to the MUX which itself is a value of 1. When the Tap Con signal is a 0, the confidence signal is selected to scale the EQ error. The confidence signal itself, which ranges in value from greater than 0 to less than 1, scales the EQ error downward when the confidence in Î, a soft decision, is low at that tap position. This scaling of the EQ error helps the equalizer to converge more reliably than unscaled updating and is yet another aspect of the invention.

Figure 8D:
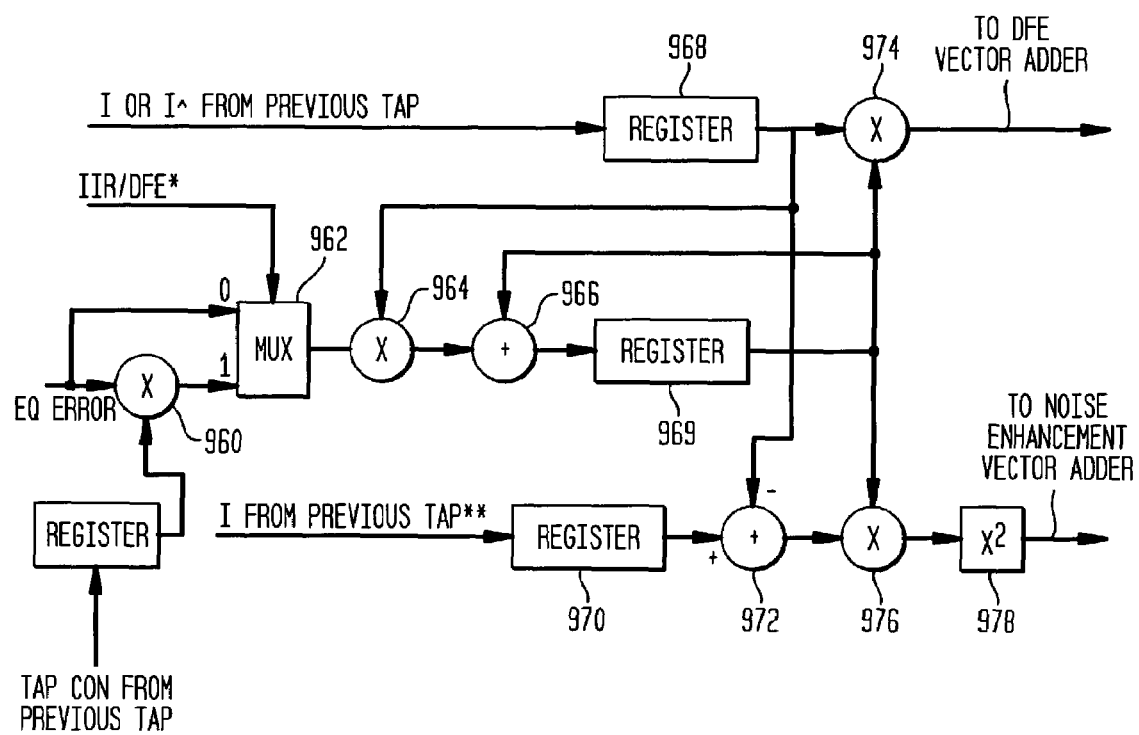
FIG. 8d is a detailed block diagram of a single tap of the DFE equalizer found in FIG. 8 that utilizes a first method of coefficient updating and a second method of computing the noise enhancement signal.

FIG. 8d shows another method of computing the. noise enhancement control signal, which can be used with the coefficient updating methods shown in FIGS. 8a to 8c (the first method of coefficient updating as shown in FIG. 8a is shown in FIG. 8d). In this case the noise enhancement control signal is obtained by multiplying the difference between the IIR and the DFE symbol (I-Î) with the coefficient at that symbol, squaring the result and summing over all the coefficients. Note that to compute the difference term (I-Î), it is necessary to store IIR symbol (I) for all the taps in a tap delay line similar to the tap delay line shown in FIG. 8.

Yet another method of computing the noise enhancement control signal is based on the reliability of the DFE decisions. Note that the method of computing the noise enhancement signal described in FIG. 8d is more reliable when the DFE decisions are somewhat reliable. Initially, when the DFE decisions are very unreliable, then the first method can be used, followed by a switch to this method as the DFE decisions become more reliable. This switch can be controlled by the confidence measure as described earlier.

FIG. 9 is a detailed block diagram of the Carrier Control Unit. Again, it responds to the CMA/DD, Robust/Normal and Path metric ave. signals in a way similar to the ECU. If the Out signal from Logic Unit 916 is a zero, indicating poor confidence in the symbol estimate, the upper input of MUXes 914a and 914b are selected, selecting K1_C_CMA and K2_C_CMA for the loop filter. These values would be set to provide a narrower loop bandwidth that the "DD" settings, effectively allowing the NCO to coast through these symbol intervals. Simultaneously, phase detector 912 would be set to a coarse carrier mode. The difference between coarse and fine or full directed mode is known to those skilled in the art and it is known to use coarse estimates when the confidence low. Conversely, when the Out signal is 1, the phase detector is switched to full directed mode by selecting the Î signal which in turn is derived from Z2/Z1/Z0 by Mapper 910 and the K1_C_DD and K2_C_DD values for the loop filter are selected. These values would be chosen to provide a wider loop bandwidth, indicating higher confidence in the symbol estimate and hence the carrier phase error estimate that results from it. The phase detector and MUX outputs are processed by 918 in a known manner. For completeness, the EQ error from the ECU is converted to passband by multiplier 920 for the passband forward equalizer.

FIG. 10 is detailed block diagram of the symbol timing control unit (STCU). It works in a way very similar to the CCU except that it has three types of timing error signals to choose from: band edge, coarse timing and full decision directed. The STCU switches from coarse to full using the same criteria and methods as the CCU. Switching is achieved by logic unit 956, MUXes 954a and 954b, phase detector 952 and mapper 950. The difference with this block is that during acquisition it chooses the band edge signal in MUX 954c until the equalizer has sufficiently converged so that the robust symbol decisions are accurate. The selection between bandedge and decision directed is controlled by the BE/DD signal. Loop filter/NCO 958 operates in a known manner to control the Symbol timing matched filter block.

What is claimed is:

1. In a communication system having a transmitter responsive to first and second data corresponding to respective first and second symbols, said transmitter encoding said first data by a normal encoding method, encoding said second data by a robust encoding method and multiplexing normal encoded data with robust encoded data, to form encoded multiplexed data, said communication system having a transmitter providing trellis encoded symbols, and a receiver having a trellis decoder for decoding said trellis encoded symbols, wherein said receiver includes stored path metrics for a plurality of state transition paths through said trellis decoder, and a receiver method including selecting the minimum path metric of said stored path metrics corresponding to the most likely path for each particular state of said trellis decoder, and selecting a survivor path corresponding to said selected minimum path metric and generating a Path Metric Minimum function, wherein said trellis decoder further includes a selected Branch Metric signal, said receiver further including a normal/robust signal coupled to said trellis decoder to indicate when a normal encoded symbol or a robust encoded symbol, respectively, is being received, wherein said receiver further includes a symbol timing controller, a carrier control unit, an equalizer control unit and a decision feedback equalizer having a plurality of filter coefficients and a tapped delay line for controlling the updating of said plurality of filter coefficients of said decision feedback equalizer on a coefficient by coefficient basis, the receiver method comprising:

computing a Path Metric Minimum Average in said trellis decoder as an average of said Path Metric Minimum function wherein said Path Metric Minimum Average is an indication of the reliability of the survivor paths being selected by said trellis decoder;

using said Path Metric Minimum Average and said normal/robust signal in said symbol timing controller to control symbol timing recovery;

using said Path Metric Minimum Average and said normal/robust signal in said carrier control unit to control carrier recovery;

using said Path Metric Minimum Average and said normal/robust signal in said equalizer control unit;

generating a Tap Control signal in said equalizer control unit for use in said decision feedback equalizer wherein said Tap Control signal at each tap position of said tapped delay line is a first value if the symbol at a tap is a symbol with a high reliability of being correct and a second value if the symbol at said tap is a symbol that could not be reliably predicted;

using said Tap Control signal in said decision feedback equalizer to generate a Noise Enhancement signal proportional to a level of noise in said receiver;

using said Noise Enhancement signal to modify said selected Branch Metric signal in said trellis decoder to produce an adjusted selected Branch Metric signal; and using said adjusted selected Branch Metric signal and said normal/robust signal in said trellis decoder to generate said Path Metric Minimum Average.

2. In a communication system having a transmitter responsive to first and second data corresponding to respective first and second symbols, said transmitter encoding said first data by a normal encoding method, encoding said second data by a robust encoding method and multiplexing normal encoded data with robust encoded data, to form encoded multiplexed data, said communication system having a transmitter providing trellis encoded symbols, and a receiver having a trellis decoder for decoding said trellis encoded symbols, wherein said receiver includes stored path metrics for a plurality of state transition paths through said trellis decoder, and a receiver method including selecting the minimum path metric of said stored path metrics corresponding to the most likely path for each particular state of said trellis decoder, and selecting a survivor path corresponding to said selected minimum path metric and generating a Path Metric Minimum function, wherein said trellis decoder further includes a selected Branch Metric signal, said receiver further including a normal/robust signal coupled to said trellis decoder to indicate when a normal encoded symbol or a robust encoded symbol, respectively, is being received, wherein said receiver further includes a symbol timing controller, a carrier control unit, an equalizer control unit and a decision feedback equalizer having a plurality of filter coefficients and a tapped delay line for controlling the updating of said plurality of filter coefficients of said decision feedback equalizer on a coefficient by coefficient basis, the receiver comprising:

- a trellis decoder with a Path Metric Minimum Average generator wherein said Path Metric Minimum Average is an average of said Path Metric Minimum function and is an indication of the reliability of the survivor paths being selected by said trellis decoder;
- a symbol timing controller responsive to said Path Metric Minimum Average and said normal/robust signal to control symbol timing recovery;
- a carrier recovery control unit, responsive to said Path Metric Minimum Average and said normal/robust signal to control carrier recovery;
- an equalizer control unit responsive to said Path Metric Minimum Average and said normal/robust signal to control said decision feedback equalizer;
- said equalizer control unit further including a Tap Control signal generator in said equalizer control unit coupled to said decision feedback equalizer wherein said Tap Control signal at each tap position of said tapped delay line is a first value if the symbol at a tap is a symbol with a high reliability of being correct and a second value if the symbol at said tap is a symbol that could not be reliably predicted;
- a Noise Enhancement signal generator in said decision feedback equalizer responsive to said Tap Control signal to generate a Noise Enhancement signal proportional to a level of noise in said receiver;
- said trellis decoder further including a Branch Metric signal modification circuit responsive to said Noise Enhancement signal to modify said selected Branch Metric signal in said trellis decoder to produce an adjusted selected Branch Metric signal; and
- said trellis decoder further being responsive to said adjusted selected Branch Metric signal and said normal/robust signal in said trellis decoder to generate said Path Metric Minimum Average.

3. In a communication system having a transmitter providing trellis encoded symbols, and a receiver shaving a trellis decoder for decoding said trellis encoded symbols, wherein said receiver includes stored path metrics for a plurality of state transition paths through said trellis decoder, and a receiver method including selecting the minimum path metric of said stored path metrics corresponding to the most likely path for each particular state of said trellis decoder, and selecting a survivor path corresponding to said selected minimum path metric and generating a Path Metric Minimum function, an improved method comprising:

computing a Path Metric Minimum Average as an average of said Path Metric Minimum function wherein said Path Metric Minimum Average is an indication of the reliability of the survivor paths being selected by said trellis decoder;

wherein said communication system is responsive to first and second data corresponding to respective first and second symbols, said transmitter encoding said first data by a normal encoding method, encoding said second data by a robust encoding method and multiplexing normal encoded data with robust encoded data, to form encoded multiplexed data, said receiver further including a normal/robust signal coupled to said trellis decoder, said improvement further comprising:

decoding said encoded multiplexed data by a normal decoding method when said normal/robust signal indicates a normal data transmission and decoding said encoded multiplexed data by a robust decoding method when said normal/robust signal indicates a robust data transmission.

4. A receiver method in accordance with claim 3, wherein said receiver further includes a symbol timing controller, said method further comprising using said Path Metric Minimum Average in said symbol timing controller to control symbol timing recovery.

5. A receiver method in accordance with claim 3, wherein said receiver further includes a carrier control unit, said method further comprising using said Path Metric Minimum Average in said carrier control unit to control carrier recovery.

6. A receiver method in accordance with claim 3, wherein said receiver further includes an equalizer control unit, said method further comprising using said Path Metric Minimum Average in said equalizer control unit.

7. A receiver method in accordance with claim 3, wherein said receiver further includes a decision feedback equalizer having a plurality of filter coefficients and a tapped delay line for controlling the updating of said plurality of filter coefficients of said decision feedback equalizer on a coefficient by coefficient basis and an equalizer control unit, said method further comprising:

generating a Tap Control signal in said equalizer control unit for use in said decision feedback equalizer wherein said Tap Control signal at each tap position of said tapped delay line is a first value if the symbol at a tap is a symbol with a high reliability of being correct and a second value if the symbol at said tap is a symbol that could not be reliably predicted.

8. A receiver method in accordance with claim 7, further including:

selecting hard decision symbols ($\hat{I}$) for said decision feedback equalizer when said Tap Control signal is said first value; and selecting soft decision symbols (I) for said decision feedback equalizer when said Tap Control signal is said second value.

9. A receiver method in accordance with claim 7, wherein said Tap Control signal is said first value when, said decision feedback equalizer is operated in a decision directed mode, and said robust/normal signal indicates a normal data transmission, and said Path Metric Minimum Average is below a given normal symbol threshold,

OR said decision feedback equalizer is operated in a decision directed mode, and said robust/normal signal indicates a robust data transmission, and said Path Metric Minimum Average is below a given robust symbol threshold.

10. A receiver method in accordance with claim 7 further comprising using said Tap Control signal in said decision feedback equalizer to generate a Noise Enhancement signal proportional to a level of noise in said receiver.

11. A receiver method in accordance with claim 10 wherein said trellis decoder further includes a selected Branch Metric signal, said method further comprising using said Noise Enhancement signal to modify said selected Branch Metric signal to produce an adjusted selected Branch Metric signal.

12. A receiver method in accordance with claim 11, using said adjusted selected Branch Metric signal in said trellis decoder to generate said Path Metric Minimum Average.

13. A receiver method in accordance with claim 10, further including a method for generating said Noise Enhancement signal comprising:
inverting said Tap Control signal to form a negated Tap Control signal, wherein negating said Tap Control signal means substituting said first value for said second value and substituting said second value for said first value;
multiplying said negated Tap Control signal by a corresponding coefficient of said decision feedback equalizer corresponding to the tap of said tapped delay line of said decision feedback equalizer to form a scaled coefficient for said tap;
squaring each said scaled coefficient to form a squared scaled coefficient for each tap of said tapped delay line; and
summing said squared scaled coefficient for each tap of said tapped delay line to form said Noise Enhancement signal.

14. A receiver method in accordance with claim 10, further including a method for generating said Noise Enhancement signal, further including a tapped delay line for storing past soft decision symbols (I), said method comprising:
computing the difference term (I−I^) between past soft decision symbols (I) and hard decision symbols (I^);
multiplying the difference term (I−I^) by the corresponding coefficient of said decision feedback equalizer corresponding to the tap of said tapped delay line of said decision feedback equalizer to form a scaled coefficient for said tap;
squaring each said scaled coefficient to form a squared scaled coefficient for each tap of said tapped delay line; and
summing said squared scaled coefficients for each tap of said tapped delay line to form said Noise Enhancement signal.

15. In a communication system having a transmitter providing trellis encoded symbols, and a receiver having a trellis decoder for decoding said trellis encoded symbols, wherein said receiver includes stored path metrics for a plurality of state transition paths through said trellis decoder, and receiver method including selecting the minimum path metric of said stored path metrics corresponding to the most likely path for each particular state of said trellis decoder, and selecting a survivor path corresponding to said selected minimum path metric and generating a Path Metric Minimum function, an improved receiver apparatus comprising:
a trellis decoder with a Path Metric Minimum Average generator wherein said Path Metric Minimum Average is an average of said Path Metric Minimum function and is an indication of the reliability of the survivor paths being selected by said trellis decoder;
wherein said communication system is responsive to first and second data corresponding to respective first and second symbols, said transmitter encoding said first data by a normal encoding method, encoding said second data by a robust encoding method and multiplexing normal encoded data with robust encoded data, to form encoded multiplexed data, said receiver further including a normal/robust signal coupled to said trellis decoder, said improvement further comprising:
a normal decoder coupled to said encoded multiplexed data when said normal/robust signal indicates a normal data transmission and
a robust decoder coupled to said encoded multiplexed data when said normal/robust signal indicates a robust data transmission.

16. A receiver apparatus in accordance with claim 15, said receiver apparatus further comprising a symbol timing controller responsive to said Path Metric Minimum Average in said symbol timing controller to control symbol timing recovery.

17. A receiver apparatus in accordance with claim 15, wherein said receiver further comprising a carrier recovery control unit, responsive to said Path Metric Minimum Average and said normal/robust signal to control carrier recovery.

18. A receiver apparatus in accordance with claim 15, wherein said receiver further includes an equalizer control unit responsive to said Path Metric Minimum Average and said normal/robust signal to control said decision feedback equalizer.

19. A receiver apparatus in accordance with claim 15, wherein said receiver further includes a decision feedback equalizer having a plurality of filter coefficients and a tapped delay line for controlling the updating of said plurality of filter coefficients of said decision feedback equalizer on a coefficient by coefficient basis and an equalizer control unit, said equalizer control unit further comprising:
a Tap Control signal generator in said equalizer control unit coupled to said decision feedback equalizer wherein said Tap Control signal at each tap position of said tapped delay line is a first value if the symbol at a tap is a symbol with a high reliability of being correct and a second value if the symbol at said tap is a symbol that could not be reliably predicted.

20. A receiver apparatus in accordance with claim 19, further including:
a multiplexer (MUX) responsive to said Tap Control signal to select hard decision symbols (I^) for said decision feedback equalizer when said Tap Control signal is said first value; and to select soft decision symbols (I) for said decision feedback equalizer when said Tap Control signal is said second value.

21. A receiver apparatus in accordance with claim 19, wherein said Tap Control signal is said first value when,
said decision feedback equalizer is operated in a decision directed mode, and said robust/normal signal indicates a normal data transmission, and said Path Metric Minimum Average is below a given normal symbol threshold,
OR
said decision feedback equalizer is operated in a decision directed mode, and said robust/normal signal indicates a robust data transmission, and said Path Metric Minimum Average is below a given robust symbol threshold.

22. A receiver apparatus in accordance with claim 19 further comprising a Noise Enhancement signal generator in said decision feedback equalizer responsive to said Tap Control signal to generate a Noise Enhancement signal proportional to a level of noise in said receiver.

23. A receiver apparatus in accordance with claim 22, said trellis decoder further including a Branch Metric signal modification circuit responsive to said Noise Enhancement signal to modify said selected Branch Metric signal in said trellis decoder to produce an adjusted selected Branch Metric signal.

24. A receiver apparatus in accordance with claim 23, said trellis decoder further being responsive to said adjusted selected Branch Metric signal and said normal/robust signal in said trellis decoder to generate said Path Metric Minimum Average.

25. A receiver apparatus in accordance with claim 22, wherein said Noise Enhancement signal generator in said decision feedback equalizer comprises:
- an inverter coupled to said Tap Control signal to form a negated Tap Control signal, wherein negating said Tap Control signal means substituting said first value for said second value and substituting said second value for said first value;
- a multiplier responsive to said negated Tap Control signal and the corresponding coefficient of said decision feedback equalizer corresponding to the tap of said tapped delay line of said decision feedback equalizer to form a scaled coefficient for said tap;
- a squaring circuit responsive to each said scaled coefficient to form a squared scaled coefficient for each tap of said tapped delay line; and
- an adder circuit responsive to said squared scaled coefficients for each tap of said tapped delay line to form said Noise Enhancement signal.

26. A receiver apparatus in accordance with claim 22, further including a tapped delay line for storing past soft decision symbols (I), wherein said Noise Enhancement signal generator in said decision feedback equalizer comprises:
- a subtractor circuit coupled to I and I^, the output of said subtractor circuit being the difference term (I-I^) between past soft decision symbols (I) and hard decision symbols (I^);
- a multiplier coupled to said difference term (I-I^), the output of said multiplier being the difference term (I-I^) multiplied by the corresponding coefficient of said decision feedback equalizer corresponding to the tap of said tapped delay line of said decision feedback equalizer to form a scaled coefficient for said tap;
- a squaring circuit coupled to each said scaled coefficient to form a squared scaled coefficient for each tap of said tapped delay line; and
- an adder circuit responsive to said squared scaled coefficients for each tap of said tapped delay line to form said Noise Enhancement signal.

27. In a communication system having a transmitter providing trellis encoded symbols, and a receiver having a trellis decoder for decoding said trellis encoded symbols, wherein said receiver includes stored path metrics for a plurality of state transition paths through said trellis decoder, and a receiver method including selecting the minimum path metric of said stored path metrics corresponding to the most likely path for each particular state of said trellis decoder, and selecting a survivor path corresponding to said selected minimum path metric and generating a Path Metric Minimum function, wherein said communication system is responsive to first and second data corresponding to respective first and second symbols, said transmitter encoding said first data by a normal encoding method, encoding said second data by a robust encoding method and multiplexing normal encoded data with robust encoded data, to form encoded multiplexed data, said receiver further including a normal/robust signal coupled to said trellis decoder, wherein said receiver further includes a symbol timing controller to control symbol timing recovery, an improved method comprising:
- computing a Path Metric Minimum Average as the average of said Path Metric Minimum function wherein said Path Metric Minimum Average is an indication of the reliability of the survivor paths being selected by said trellis decoder;
- generating a symbol timing recovery loop bandwidth selection signal in said symbol timing controller responsive to said normal/robust signal and said Path Metric Minimum Average for selecting a loop bandwidth constant for the symbol timing recovery loop filter;
- selecting a Constant Modulus Algorithm (CMA) symbol timing recovery loop bandwidth constant if said symbol timing recovery loop bandwidth selection signal is a first value; and
- selecting a decision directed (DD) symbol timing recovery loop bandwidth constant if said symbol timing recovery loop bandwidth selection signal is a second value.

28. A receiver method in accordance with claim 27, wherein said symbol timing recovery loop bandwidth selection signal is said second value when,
said robust/normal signal indicates a normal data transmission, and said Path Metric Minimum Average is below a given normal symbol threshold,
OR
said robust/normal signal indicates a robust data transmission, and said Path Metric Minimum Average is below a given robust symbol threshold.

29. A receiver method in accordance with claim 27, further including:
- selecting hard decision symbols (I^) for said symbol timing recovery loop filter when said symbol timing recovery loop bandwidth selection signal is said first value; and
- selecting band edge soft decision symbols (I) for said for said symbol timing recovery loop filter when said symbol timing recovery loop bandwidth selection signal is said second value.

30. In a communication system having a transmitter providing trellis encoded symbols, and a receiver having a trellis decoder for decoding said trellis encoded symbols, wherein said receiver includes stored path metrics for a plurality of state transition paths through said trellis decoder, and a receiver method including selecting the minimum path metric of said stored path metrics corresponding to the most likely path for each particular state of said trellis decoder, and selecting a survivor path corresponding to said selected minimum path metric and generating a Path Metric Minimum function, wherein said communication system is responsive to first and second data corresponding to respective first and second symbols, said transmitter encoding said first data by a normal encoding method, encoding said second data by a robust encoding method and multiplexing normal encoded data with robust encoded data, to form encoded multiplexed data, said receiver further including a normal/robust signal coupled to said trellis decoder, wherein said receiver further includes a symbol timing controller to control symbol timing recovery, a receiver improvement comprising:

a trellis decoder with a Path Metric Minimum Average generator wherein said Path Metric Minimum Average is an average of said Path Metric Minimum function and is an indication of the reliability of the survivor paths being selected by said trellis decoder;

a symbol timing recovery loop bandwidth selection signal generator in said symbol timing controller responsive to said normal/robust signal and said Path Metric Minimum Average; and a multiplexer (MUX) responsive to said symbol timing recovery loop bandwidth selection signal to select a Constant Modulus Algorithm (CMA) symbol timing recovery loop bandwidth constant when said symbol timing recovery loop bandwidth selection signal is a first value, and to select a decision directed (DD) symbol timing recovery loop bandwidth constant if said symbol timing recovery loop bandwidth selection signal is a second value.

31. A receiver apparatus in accordance with claim 30, wherein said symbol timing recovery loop bandwidth selection signal is said second value when, said robust/normal signal indicates a normal data transmission, and said Path Metric Minimum Average is below a given normal symbol threshold,

OR said robust/normal signal indicates a robust data transmission, and said Path Metric Minimum Average is below a given robust symbol threshold.

32. A receiver apparatus in accordance with claim 30, further including:

a multiplexer (MUX) responsive to said symbol timing recovery loop bandwidth selection signal to select hard decision symbols (Î) for said symbol timing recovery loop filter when said symbol timing recovery loop bandwidth selection signal is said first value; and to select soft decision symbols (I) for said symbol timing recovery loop filter when said symbol timing recovery loop bandwidth selection signal is said second value.

33. In a communication system having a transmitter providing trellis encoded symbols, and a receiver having a trellis decoder for decoding said trellis encoded symbols, wherein said receiver includes stored path metrics for a plurality of state transition paths through said trellis decoder, and a receiver method including selecting the minimum path metric of said stored path metrics corresponding to the most likely path for each particular state of said trellis decoder, and selecting a survivor path corresponding to said selected minimum path metric and generating a Path Metric Minimum function, wherein said communication system is responsive to first and second data corresponding to respective first and second symbols, said transmitter encoding said first data by a normal encoding method, encoding said second data by a robust encoding method and multiplexing normal encoded data with robust encoded data, to form encoded multiplexed data, said receiver further including a normal/robust signal coupled to said trellis decoder, wherein said receiver further includes a carrier control unit, an improved method comprising:

computing a Path Metric Minimum Average as the average of said Path Metric Minimum function wherein said Path Metric Minimum Average is an indication of the reliability of the survivor paths being selected by said trellis decoder;

generating a carrier loop bandwidth selection signal in said carrier control unit responsive to said normal/robust signal and said Path Metric Minimum Average for selecting a loop bandwidth constant for the carrier recovery loop filter;

selecting a Constant Modulus Algorithm (CMA) carrier loop bandwidth constant if said carrier loop bandwidth selection signal is a first value; and selecting a decision directed (CDD) carrier loop bandwidth constant if said carrier loop bandwidth selection signal is a second value.

34. A receiver method in accordance with claim 33, wherein said receiver further includes a decision feedback equalizer having a plurality of filter coefficients and a tapped delay line for controlling the updating of said plurality of filter coefficients of said decision feedback equalizer on a coefficient by coefficient basis and an equalizer control unit, wherein said carrier loop bandwidth selection signal is said second value when, said decision feedback equalizer is operated in a decision directed mode, and said robust/normal signal indicates a normal data transmission, and said Path Metric Minimum Average is below a given normal symbol threshold,

OR said decision feedback equalizer is operated in a decision directed mode, and said robust/normal signal indicates a robust data transmission, and said Path Metric Minimum Average is below a given robust symbol threshold.

35. A receiver method in accordance with claim 33, further including:

selecting hard decision symbols (Î) for said carrier recovery loop filter when said carrier loop bandwidth selection signal is said first value; and selecting soft decision symbols (I) for said for said carrier recovery loop filter when said carrier loop bandwidth selection signal is said second value.

36. In a communication system having a transmitter providing trellis encoded symbols, and a receiver having a trellis decoder for decoding said trellis encoded symbols, wherein said receiver includes stored path metrics for a plurality of state transition paths through said trellis decoder, and a receiver method including selecting the minimum path metric of said stored path metrics corresponding to the most likely path for each particular state of said trellis decoder, and selecting a survivor path corresponding to said selected minimum path metric and generating a Path Metric Minimum function, wherein said communication system is responsive to first and second data corresponding to respective first and second symbols, said transmitter encoding said first data by a normal encoding method, encoding said second data by a robust encoding method and multiplexing normal encoded data with robust encoded data, to form encoded multiplexed data, said receiver further including a normal/robust signal coupled to said trellis decoder, wherein said receiver further includes a carrier control unit, an improved apparatus comprising:

a trellis decoder with a Path Metric Minimum Average generator wherein said Path Metric Minimum Average is an average of said Path Metric Minimum function and is an indication of the reliability of the survivor paths being selected by said trellis decoder;

a carrier loop bandwidth selection signal generator in said carrier control unit responsive to said normal/robust signal and said Path Metric Minimum Average; and a multiplexer (MUX) responsive to said symbol timing recovery loop bandwidth selection signal to select a Constant Modulus Algorithm (CMA) symbol timing recovery loop bandwidth constant when said symbol timing recovery loop bandwidth selection signal is a first value, and to select a decision directed (DD) symbol timing recovery loop bandwidth constant if said symbol timing recovery loop bandwidth selection signal is a second value.

37. A receiver apparatus in accordance with claim 36, wherein said receiver further includes a decision feedback equalizer having a plurality of filter coefficients and a tapped delay line for controlling the updating of said plurality of filter coefficients of said decision feedback equalizer on a coefficient by coefficient basis and an equalizer control unit, wherein said carrier loop bandwidth selection signal is said second value when, said decision feedback equalizer is operated in a decision directed mode, and said robust/normal signal indicates a normal data transmission, and said Path Metric Minimum Average is below a given normal symbol threshold,

OR said decision feedback equalizer is operated in a decision directed mode, and said robust/normal signal indicates a robust data transmission, and said Path Metric Minimum Average is below a given robust symbol threshold.

38. A receiver apparatus in accordance with claim 36, further including:

a multiplexer (MUX) responsive to said carrier loop bandwidth selection signal to select hard decision symbols (Î) for said carrier recovery loop filter when said carrier loop bandwidth selection signal is said first value; and to select soft decision symbols (I) for said carrier recovery loop filter when said carrier loop bandwidth selection signal is said second value.

39. In a communication system having a transmitter providing trellis encoded symbols, and a receiver having a trellis decoder for decoding said trellis encoded symbols, wherein said receiver includes stored path metrics for a plurality of state transition paths through said trellis decoder, and a receiver method including selecting the minimum path metric of said stored path metrics corresponding to the most likely path for each particular state of said trellis decoder, and selecting a survivor path corresponding to said selected minimum path metric and generating a Path Metric Minimum function, wherein said communication system is responsive to first and second data corresponding to respective first and second symbols, said transmitter encoding said first data by a normal encoding method, encoding said second data by a robust encoding method and multiplexing normal encoded data with robust encoded data, to form encoded multiplexed data, said receiver further including a normal/robust signal coupled to said trellis decoder, wherein said receiver further includes a decision feedback equalizer having a plurality of filter coefficients and a tapped delay line for controlling the coefficient updating of the coefficients of said decision feedback equalizer on a coefficient by coefficient basis and an equalizer control unit, an improved method comprising:

computing a Path Metric Minimum Average as the average of said Path Metric Minimum function wherein said Path Metric Minimum Average is an indication of the reliability of the survivor paths being selected by said trellis decoder;

generating an error selection signal in said equalizer control unit responsive to said normal/robust signal and said Path Metric Minimum Average for selecting an error function for said decision feedback equalizer;

selecting function Constant Modulus Algorithm (CMA) error function Constant Modulus Algorithm (CMA) error function if said error selection signal is a first value; and selecting function decision directed (DD) error function decision directed (DD) error function if said error selection signal is a second value.

40. A receiver method in accordance with claim 39, wherein said error selection signal is said second value when, said decision feedback equalizer is operated in a decision directed mode, and said robust/normal signal indicates a normal data transmission, and said Path Metric Minimum Average is below a given normal symbol threshold,

OR said decision feedback equalizer is operated in a decision directed mode, and said robust/normal signal indicates a robust data transmission, and said Path Metric Minimum Average is below a given robust symbol threshold.

41. In a communication system having a transmitter providing trellis encoded symbols, and a receiver having a trellis decoder for decoding said trellis encoded symbols, wherein said receiver includes stored path metrics for a plurality of state transition paths through said trellis decoder, and a receiver method including selecting the minimum path metric of said stored path metrics corresponding to the most likely path for each particular state of said trellis decoder, and selecting a survivor path corresponding to said selected minimum path metric and generating a Path Metric Minimum function, wherein said communication system is responsive to first and second data corresponding to respective first and second symbols, said transmitter encoding said first data by a normal encoding method, encoding said second data by a robust encoding method and multiplexing normal encoded data with robust encoded data, to form encoded multiplexed data, said receiver further including a normal/robust signal coupled to said trellis decoder, wherein said receiver further includes a decision feedback equalizer having a plurality of filter coefficients and a tapped delay line for controlling the coefficient updating of the coefficients of said decision feedback equalizer on a coefficient by coefficient basis and an equalizer control unit, an improved apparatus comprising:

a trellis decoder with a Path Metric Minimum Average generator wherein said Path Metric Minimum Average is an average of said Path Metric Minimum function and is an indication of the reliability of the survivor paths being selected by said trellis decoder;

an error selection signal generator in said equalizer control unit responsive to said normal/robust signal and said Path Metric Minimum Average for selecting an error function for said decision feedback equalizer; and a multiplexer (MUX) responsive to said error selection signal to select function Constant Modulus Algorithm (CMA) error function Constant Modulus Algorithm (CMA) error function when said error selection signal is a first value, and to select function decision directed (DD) error function decision directed (DD) error function when said error selection signal is a second value.

42. A receiver method in accordance with claim 41, wherein said error selection signal is said second value when, said decision feedback equalizer is operated in a decision directed mode, and said robust/normal signal indicates a normal data transmission, and said Path Metric Minimum Average is below a given normal symbol threshold,

OR said decision feedback equalizer is operated in a decision directed mode, and said robust/normal signal indicates a robust data transmission, and said Path Metric Minimum Average is below a given robust symbol threshold.

43. In a communication system having a transmitter providing trellis encoded symbols, wherein said communication system is responsive to first and second data, encoding said first data by a normal encoding method, encoding said second data by a robust encoding method and multiplexing normal encoded data with robust encoded data, to form encoded multiplexed data, and a receiver having a trellis decoder for decoding said trellis encoded symbols, an equalizer control unit and a decision feedback equalizer having a plurality of filter coefficients and a tapped delay line for controlling the coefficient updating of the coefficients of said decision feedback equalizer on a coefficient by coefficient basis, wherein said receiver includes the method of storing the path metrics for a plurality of state transition paths through said trellis decoder, selecting the minimum of said stored path metrics to generate the most likely path for each particular state of said trellis decoder and selecting a survivor path corresponding to said selected minimum path metric, and generating a Path Metric Minimum function and a selected Branch Metric signal, an improved receiver method comprising:

computing a Path Metric Minimum Average as the average of said Path Metric Minimum function wherein said Path Metric Minimum Average is an indication of the reliability of the survivor paths being selected by said trellis decoder;

generating a Tap Control signal responsive to said Path Metric Minimum Average in said equalizer control unit for use in said decision feedback equalizer, wherein said Tap Control signal at each tap position of said tapped delay line is a first value if the symbol at a tap is a symbol with a high reliability of being correct and a second value if the symbol at said tap is a symbol that could not be reliably predicted;

using said Tap Control signal in said decision feedback equalizer to generate a Noise Enhancement signal proportional to a level of noise in said receiver;

using said Noise Enhancement signal to modify said selected Branch Metric signal to produce an adjusted selected Branch Metric signal; and using said adjusted selected Branch Metric signal in said trellis decoder to generate said Path Metric Minimum Average.

44. a receiver method in accordance with claim 43, wherein said receiver further including a normal/robust signal coupled to said trellis decoder, and said receiver method further comprises:

decoding said encoded multiplexed data by a normal decoding method when said normal/robust signal indicates a normal data transmission, and decoding said encoded multiplexed data by a robust decoding method when said normal/robust signal indicates a robust data transmission.

45. A receiver method in accordance with claim 44, wherein said Tap Control signal is said first value when, said decision feedback equalizer is operated in a decision directed mode, and said robust/normal signal indicates a normal data transmission, and said Path Metric Minimum Average is below a given normal symbol threshold,

OR said decision feedback equalizer is operated in a decision directed mode, and said robust/normal signal indicates a robust data transmission, and said Path Metric Minimum Average is below a given robust symbol threshold.

46. A receiver method in accordance with claim 43, further including a method for generating said Noise Enhancement signal, said method comprising:

inverting said Tap Control signal to form a negated Tap Control signal, wherein negating said Tap Control signal means substituting said first value for said second value and substituting said second value for said first value;

multiplying said negated Tap Control signal by the corresponding coefficient of said decision feedback equalizer corresponding to the tap of said tapped delay line of said decision feedback equalizer to form a scaled coefficient for said tap;

squaring each said scaled coefficient to form a squared scaled coefficient for each tap of said tapped delay line; and summing said squared scaled coefficients for each tap of said tapped delay line to form said Noise Enhancement signal.

47. A receiver method in accordance with claim 43, further including a method for generating said Noise Enhancement signal, said receiver further including a tapped delay line for storing past soft decision symbols (I), said method for generating said Noise Enhancement signal comprising:

computing the difference term (I–I^) between past soft decision symbols (I) and hard decision symbols (I^);

multiplying the difference term (I–I^) by the corresponding coefficient of said decision feedback equalizer corresponding to the tap of said tapped delay line of said decision feedback equalizer to form a scaled coefficient for said tap;

squaring each said scaled coefficient to form a squared scaled coefficient for each tap of said tapped delay line; and summing said squared scaled coefficients for each tap of said tapped delay line to form said Noise Enhancement signal.

48. A method in accordance claim 43, wherein said step of using said Noise Enhancement signal to modify said selected Branch Metric signal comprises:

generating a Noise Enhancement signal proportional to a level of noise in said receiver; and modifying said selected Branch Metric signal using said Noise Enhancement signal to provide said adjusted selected Branch Metric signal.

49. A method in accordance claim 43, wherein said step of using said Noise Enhancement signal to modify said selected Branch Metric signal to produce an adjusted selected Branch Metric signal comprises:

generating a Noise Enhancement signal proportional to a level of noise in said receiver;

computing a Confidence factor from said Noise Enhancement Signal and the long average of channel noise (average noise), wherein said Confidence factor is a scaling factor proportional to the confidence in a received symbol; and modifying said selected Branch Metric signal using said Confidence factor as a scaling factor to provide said adjusted selected Branch Metric signal.

50. A method in accordance claim 43, wherein said step of using said Noise Enhancement signal to modify said selected Branch Metric signal comprises:

generating a Noise Enhancement signal proportional to a level of noise in said receiver;

computing a Confidence factor from said Noise Enhancement Signal and a long average of channel noise (average noise), wherein said Confidence factor is a scaling factor proportional to the confidence in a received symbol;

multiplying said selected Branch Metric signal using said Confidence factor as a scaling factor to a scaled selected Branch Metric signal;

squaring said scaled selected Branch Metric signal to provide a squared selected Branch Metric signal; and processing said squared selected Branch Metric signal in a log-likelihood look up table to provide said adjusted selected Branch Metric signal.

51. In a communication system having a transmitter providing trellis encoded symbols, wherein said communication system is responsive to first and second data, encoding said first data by a normal encoding method, encoding said second data by a robust encoding method and multiplexing normal encoded data with robust encoded data, to form encoded multiplexed data, and a receiver having a trellis decoder for decoding said trellis encoded symbols, an equalizer control unit and a decision feedback equalizer having a plurality of filter coefficients and a tapped delay line for controlling the coefficient updating of the coefficients of said decision feedback equalizer on a coefficient by coefficient basis, wherein said receiver includes a method of storing the path metrics for a plurality of state transition paths through said trellis decoder, selecting the minimum of said stored path metrics to generate the most likely path for each particular state of said trellis decoder and selecting a survivor path corresponding to said selected minimum path metric, and generating a Path Metric Minimum function and a selected Branch Metric signal, an improved receiver apparatus comprising:

a trellis decoder with a Path Metric Minimum Average generator wherein said Path Metric Minimum Average is an average of said Path Metric Minimum function and is an indication of the reliability of the survivor paths being selected by said trellis decoder;

said equalizer control unit further including a Tap Control signal generator in said equalizer control unit coupled to said decision feedback equalizer wherein said Tap Control signal at each tap position of said tapped delay line is a first value if the symbol at a tap is a symbol with a high reliability of being correct and a second value if the symbol at said tap is a symbol that could not be reliably predicted;

a Noise Enhancement signal generator in said decision feedback equalizer responsive to said Tap Control signal to generate a Noise Enhancement signal proportional to a level of noise in said receiver;

said trellis decoder further including a Branch Metric signal modification circuit responsive to said Noise Enhancement signal to modify said selected Branch Metric signal in said trellis decoder to produce an adjusted selected Branch Metric signal; and said trellis decoder further being responsive to said adjusted selected Branch Metric and said normal/robust signal in said trellis decoder to generate said Path Metric Minimum Average.

52. a receiver apparatus in accordance with claim 51, wherein said receiver further including a normal/robust signal coupled to said trellis decoder, and said receiver apparatus further comprises:

a normal decoder coupled to said encoded multiplexed data when said normal/robust signal indicates a normal data transmission and a robust decoder coupled to said encoded multiplexed data when said normal/robust signal indicates a robust data transmission.

53. A receiver apparatus in accordance with claim 52, wherein said Tap Control signal is said first value when, said decision feedback equalizer is operated in a decision directed mode, and said robust/normal signal indicates a normal data transmission, and said Path Metric Minimum Average is below a given normal symbol threshold,

OR said decision feedback equalizer is operated in a decision directed mode, and said robust/normal signal indicates a robust data transmission, and said Path Metric Minimum Average is below a given robust symbol threshold.

54. A receiver apparatus in accordance with claim 51, further including an apparatus for generating said Noise Enhancement signal, said apparatus comprising:

an inverter coupled to said Tap Control signal to form a negated Tap Control signal, wherein negating said Tap Control signal means substituting said first value for said second value and substituting said second value for said first value;

a multiplier responsive to said negated Tap Control signal and a corresponding coefficient of said decision feedback equalizer corresponding to the tap of said tapped delay line of said decision feedback equalizer to form a scaled coefficient for said tap;

a squaring circuit responsive to each said scaled coefficient to form a squared scaled coefficient for each tap of said tapped delay line; and an adder circuit responsive to said squared scaled coefficient for each tap of said tapped delay line to form said Noise Enhancement signal.

55. A receiver apparatus in accordance with claim 51, further including an apparatus for generating said Noise Enhancement signal, said receiver further including a tapped delay line for storing past soft decision symbols (I), said apparatus for generating said Noise Enhancement signal comprising:

a subtractor circuit coupled to I and I^, the output of said subtractor circuit being the difference term (I-I^) between past soft decision symbols (I) and hard decision symbols (I^);

a multiplier coupled to said difference term (I-I^), the output of said multiplier being the difference term (I-I^) multiplied by a corresponding coefficient of said decision feedback equalizer corresponding to a tap of said tapped delay line of said decision feedback equalizer to form a scaled coefficient for said tap;

a squaring circuit coupled to each said scaled coefficient to form a squared scaled coefficient for each tap of said tapped delay line; and an adder circuit responsive to said squared scaled coefficient for each tap of said tapped delay line to form said Noise Enhancement signal.

56. An apparatus in accordance claim 51, wherein said Branch Metric signal modification circuit responsive to said Noise Enhancement signal to modify said selected Branch Metric signal in said trellis decoder to produce an adjusted selected Branch Metric signal each comprises:
   a Noise Enhancement signal generator in said decision feedback equalizer responsive to said Tap Control signal to generate a Noise Enhancement signal proportional to the level of noise in said receiver; and
   a multiplier responsive to said selected Branch Metric signal and said Noise Enhancement signal to provide said adjusted selected Branch Metric signal.

57. An apparatus in accordance claim 51, wherein said Branch Metric signal modification circuit responsive to said Noise Enhancement signal to modify said selected Branch Metric signal in said trellis decoder to produce an adjusted selected Branch Metric signal comprises:
   a Noise Enhancement signal generator in said decision feedback equalizer responsive to said Tap Control signal to generate a Noise Enhancement signal proportional to the level of noise in said receiver;
   a Confidence factor computation circuit responsive to said Noise Enhancement Signal and the long average of channel noise (average noise), wherein said Confidence factor is a scaling factor proportional to the confidence in a received symbol; and
   said trellis decoder further including a Branch Metric signal modification circuit responsive to said Confidence factor to modify said selected Branch Metric signal in said trellis decoder to produce said adjusted selected Branch Metric signal.

58. An apparatus in accordance claim 51, wherein said Branch Metric signal modification circuit responsive to said Noise Enhancement signal to modify said selected Branch Metric signal in said trellis decoder to produce an adjusted selected Branch Metric signal comprises:
   a Noise Enhancement signal generator in said decision feedback equalizer responsive to said Tap Control signal to generate a Noise Enhancement signal proportional to the level of noise in said receiver;
   a Confidence factor computation circuit responsive to said Noise Enhancement Signal and the long average of channel noise (average noise), wherein said Confidence factor is a scaling factor proportional to the confidence in a received symbol;
   a multiplier responsive to said selected Branch Metric signal and said Confidence factor to provide a scaled selected Branch Metric signal;
   a squaring circuit responsive to said scaled selected Branch Metric signal to provide a squared selected Branch Metric signal; and
   a log-likelihood look up table responsive to said squared selected Branch Metric signal to provide said adjusted selected Branch Metric signal.

59. In a communication system having a transmitter and a receiver, wherein said receiver includes a decision feedback equalizer having a plurality of filter coefficients and a tapped delay line for controlling the coefficient updating of the coefficients of said decision feedback equalizer on a coefficient by coefficient basis and an equalizer control unit, a method comprising:
   generating a Tap Control signal in said equalizer control unit for use in said decision feedback equalizer wherein said Tap Control signal at each tap position of said tapped delay line is a first value if the symbol at a tap is a symbol with a high reliability of being correct and a second value if the symbol at said tap is a symbol that could not be reliably predicted;
   updating said coefficients if said Tap control signal is at said first value;
   holding said coefficients at its current values if said Tap control signal is at said second value;
   wherein said decision feedback equalizer includes a decision directed (DD) mode and an hR mode, and a decision feedback equalizer error term, a method for updating said plurality of filter coefficients in decision directed mode, said method comprising:
   generating a Noise Enhancement signal proportional to a level of noise in said receiver;
   computing a Confidence factor from said Noise Enhancement Signal and a long average of channel noise (average noise), wherein said Confidence factor is a scaling factor proportional to the confidence in the received symbol at that time; and
   updating corresponding ones of said plurality of filter coefficients at each tap position of said tapped delay line using said decision feedback equalizer error term scaled by said Confidence factor.

60. In a communication system having a transmitter and a receiver, wherein said receiver includes a decision feedback equalizer having a plurality of filter coefficients and a tapped delay line for controlling the coefficient updating of the coefficients of said decision feedback equalizer on a coefficient by coefficient basis and an equalizer control unit, a method comprising:
   generating a Tap Control signal in said equalizer control unit for use in said decision feedback equalizer wherein said Tap Control signal at each tap position of said tapped delay line is a first value if the symbol at a tap is a symbol with a high reliability of being correct and a second value if the symbol at said tap is a symbol that could not be reliably predicted;
   updating said coefficients if said Tap control signal is at said first value;
   holding said coefficients at its current values if said Tap control signal is at said second value;
   wherein said decision feedback equalizer includes a decision directed (DD) mode and an IIR mode, and a decision feedback equalizer error term, a method for updating said plurality of filter coefficients in decision directed mode, said method comprising:
   generating a Noise Enhancement signal proportional to a level of noise in said receiver;
   computing a Confidence factor from said Noise Enhancement Signal and a long average of channel noise (average noise), wherein said Confidence factor is a scaling factor proportional to the confidence in the received symbol at that time;
   updating corresponding ones of said plurality of filter coefficients at each tap position of said tapped delay line using said decision feedback equalizer error term when said Tap Control signal is said first value; and
   updating corresponding ones of said plurality of filter coefficients at each tap position of said tapped delay line using said decision feedback equalizer error term scaled by said Confidence factor when said Tap Control signal is said second value.

61. In a communication system having a transmitter and a receiver, wherein said receiver includes a decision feedback equalizer having a plurality of filter coefficients and a tapped delay line for controlling the coefficient updating of the coefficients of said decision feedback equalizer on a coefficient by coefficient basis and an equalizer control unit, an apparatus comprising:

said equalizer control unit further including a Tap Control signal generator in said equalizer control unit coupled to said decision feedback equalizer wherein said Tap Control signal at each tap position of said tapped delay line is a first value if the symbol at a tap is a symbol with a high reliability of being correct and a second value if the symbol at said tap is a symbol that could not be reliably predicted;

a coefficient updating circuit responsive to said Tap Control signal to update said coefficients if said Tap Control signal is at said first value, and to hold said coefficients at its current values if said Tap Control signal is at said second value;

wherein said decision feedback equalizer includes a decision directed (DD) mode and an IIR mode, and a decision feedback equalizer error term, an apparatus for updating said plurality of filter coefficients in decision directed mode, said apparatus comprising:

a Noise Enhancement signal generator in said decision feedback equalizer responsive to said Tap Control signal to generate a Noise Enhancement signal proportional to a level of noise in said receiver;

a Confidence factor computation circuit responsive to said Noise Enhancement Signal and a long average of channel noise (average noise), wherein said Confidence factor is a scaling factor proportional to the confidence in the received symbol at that time; and a filter coefficient updating circuit for updating corresponding ones of said plurality of filter coefficients at each tap position of said tapped delay line using said decision feedback equalizer error term scaled by said Confidence factor.

62. In a communication system having a transmitter and a receiver, wherein said receiver includes a decision feedback equalizer having a plurality of filter coefficients and a tapped delay line for controlling the coefficient updating of the coefficients of said decision feedback equalizer on a coefficient by coefficient basis and an equalizer control unit, an apparatus comprising:

said equalizer control unit further including a Tap Control signal generator in said equalizer control unit coupled to said decision feedback equalizer wherein said Tap Control signal at each tap position of said tapped delay line is a first value if the symbol at a tap is a symbol with a high reliability of being correct and a second value if the symbol at said tap is a symbol that could not be reliably predicted;

a coefficient updating circuit responsive to said Tap Control signal to update said coefficients if said Tap Control signal is at said first value, and to hold said coefficients at its current values if said Tap Control signal is at said second value;

wherein said decision feedback equalizer includes a decision directed (DD) mode and an IIR mode, and a decision feedback equalizer error term, an apparatus for updating said plurality of filter coefficients in decision directed mode, said apparatus comprising:

a Noise Enhancement signal generator in said decision feedback equalizer to generate a Noise Enhancement signal proportional to a level of noise in said receiver;

a Confidence factor signal generator responsive to said Noise Enhancement Signal and a long average of channel noise (average noise), wherein said Confidence factor is a scaling factor proportional to the confidence in the received symbol at that time;

a filter coefficient updating circuit responsive to said Tap Control signal for updating corresponding ones of said plurality of filter coefficients at each tap position of said tapped delay line in said decision feedback equalizer error term when said Tap Control signal is said first value; and not updating corresponding ones of said plurality of filter coefficients at each tap position of said tapped delay line using said decision feedback equalizer error term scaled by said Confidence factor when said Tap Control signal is said second value.

63. In a communication system having a transmitter providing trellis encoded symbols, a dual phase trellis decoder method comprising:

decoding a positive phase of a received signal in a first trellis decoder having stored path metrics for a plurality of state transition paths through said first trellis decoder the state of which is defined in accordance with said positive phase;

decoding a negative phase of said received signal in a second trellis decoder having stored path metrics for a plurality of state transition paths through said second trellis decoder the state of which is defined in accordance with said negative phase, selecting a first Path Metric Minimum of said stored path metrics of said first trellis decoder corresponding to the most likely path for each particular state of said first trellis decoder, and a first survivor path corresponding to the selected a first Path Metric Minimum;

selecting a second Path Metric Minimum of said stored path metrics of said second trellis decoder corresponding to the most likely path for each particular state of said second trellis decoder, and a second survivor path corresponding to the selected second Path Metric Minimum; and selecting one of said first or second survivor paths corresponding to the lower of said first Path Metric Minimum and said second Path Metric Minimum as the survivor path of said dual phase trellis decoder.

64. A method in accordance with claim 63, wherein said communication system is responsive to first and second data corresponding to respective first and second symbols, said transmitter encoding said first data by a normal encoding method, encoding said second data by a robust encoding method and multiplexing normal encoded data with robust encoded data, to form encoded multiplexed data, said receiver further including a normal/robust signal coupled to each of said first and second trellis decoders, a method in each of said first and second trellis decoders comprising:

decoding said encoded multiplexed data by a normal decoding method when said normal/robust signal indicates a normal data transmission and decoding said encoded multiplexed data by a robust decoding method when said normal/robust signal indicates a robust data transmission.

65. A method in accordance with claim 64, and wherein said communication system further includes a receiver having an equalizer control unit and a decision feedback equalizer having a plurality of filter coefficients and a tapped delay line for controlling the coefficient updating of the coefficients of said decision feedback equalizer on a coefficient by coefficient basis, wherein said receiver includes the method of storing the path metrics for a plurality of state transition paths through said first and second trellis decoders of said dual phase trellis decoder, selecting the minimum of said stored path metrics to generate the most likely path for each particular state of said first and second trellis decoders and selecting a survivor path corresponding to said selected minimum path metric, and generating a Path Metric Minimum function, wherein said dual phase trellis decoder further includes a selected Branch Metric signal, an improved receiver method comprising:

computing a Path Metric Minimum Average as the average of said Path Metric Minimum function wherein said Path Metric Minimum Average is an indication of the reliability of the survivor paths being selected by said dual phase trellis decoder;

generating a Tap Control signal responsive to said Path Metric Minimum Average in said equalizer control unit for use in said decision feedback equalizer, wherein said Tap Control signal at each tap position of said tapped delay line is a first value if the symbol at a tap is a symbol with a high reliability of being correct and a second value if the symbol at said tap is a symbol that could not be reliably predicted;

using said Tap Control signal in said decision feedback equalizer to generate a Noise Enhancement signal proportional to the level of noise in said receiver;

said method further comprising using said Noise Enhancement signal modify said selected Branch Metric signal to produce an adjusted selected Branch Metric signal; and using said adjusted selected Branch Metric signal in said dual phase trellis decoder to generate said Path Metric Minimum Average.

66. A receiver method in accordance with claim 65, wherein said Tap Control signal is said first value when, said decision feedback equalizer is operated in a DFE mode, and said normal/robust signal indicates a normal data transmission, and said Path Metric Minimum Average is below a given normal symbol threshold,

OR said decision feedback equalizer is operated in a DFE, and said normalrobust signal indicates a robust data transmission, and said Path Metric Minimum Average is below a given robust symbol threshold.

67. A receiver method in accordance with claim 65 further including a method for generating said Noise Enhancement signal, said method comprising:

inverting said Tap Control signal to form a negated Tap Control signal, wherein negating said Tap Control signal means substituting said first value for said second value and substituting said second value for said first value;

multiplying said negated Tap Control signal by a corresponding coefficient of said decision feedback equalizer corresponding to a tap of said tapped delay line of said decision feedback equalizer to form a scaled coefficient for said tap;

squaring each said scaled coefficient to form a squared scaled coefficient for each tap of said tapped delay line; and summing said squared scaled coefficient for each tap of said tapped delay line to form said Noise Enhancement signal.

68. A receiver method in accordance with claim 65, further including a method for generating said Noise Enhancement signal, further including a tapped delay line for storing past soft decision symbols (I), said method comprising:

computing the difference term (I–I^) between past soft decision symbols (I) and hard decision symbols (I^);

multiplying the difference term (I–I^) by a corresponding coefficient of said decision feedback equalizer corresponding to a tap of said tapped delay line of said decision feedback equalizer to form a scaled coefficient for said tap;

squaring each said scaled coefficient to form a squared scaled coefficient for each tap of said tapped delay line; and summing said squared scaled coefficient for each tap of said tapped delay line to form said Noise Enhancement signal.

69. In a communication system having a transmitter providing trellis encoded symbols, a dual phase trellis decoder apparatus comprising:

a first trellis decoder having stored path metrics for a plurality of state transition paths through said first trellis decoder the state of which is defined in accordance with a positive phase, said first trellis decoder adapted to select a first Path Metric Minimum of said stored path metrics corresponding to the most likely path for each particular state of said first trellis decoder, and a first survivor path corresponding to the selected first Path Metric Minimum;

a second trellis decoder having stored path metrics for a plurality of state transition paths through said first trellis decoder the state of which is defined in accordance with a negative phase; said second trellis decoder adapted to select a second Path Metric Minimum of said stored path metrics of the second trellis decoder corresponding to the most likely path for each particular state of said second trellis decoder, and a second survivor path corresponding to the selected second Path Metric Minimum; and said dual phase trellis decoder further including a multiplexer (MUX) responsive to a Resolve Phase Ambiguity signal to select one of said first or second survivor paths corresponding to the lower of said first Path Metric Minimum and said second Path Metric Minimum as the survivor path of said dual phase trellis decoder.

70. An apparatus in accordance with claim 69, wherein said communication system is responsive to first and second data corresponding to respective first and second symbols, said transmitter encoding said first data by a normal encoding method, encoding said second data by a robust encoding method and multiplexing normal encoded data with robust encoded data, to form encoded multiplexed data, said receiver further including a normal/robust signal coupled to each of said first and second trellis decoders, an apparatus in each of said first and second trellis decoders comprising:

a normal decoder coupled to said encoded multiplexed data when said normal/robust signal indicates a normal data transmission; and a robust decoder coupled to said encoded multiplexed data when said normal/robust signal indicates a robust data transmission.

71. An apparatus in accordance with claim 70, and wherein said communication system further includes a receiver having an equalizer control unit and a decision feedback equalizer having a plurality of filter coefficients and a tapped delay line for controlling the coefficient updating of the coefficients of said decision feedback equalizer on a coefficient by coefficient basis, wherein said receiver includes the method of storing the path metrics for a plurality of state transition paths through said first and second trellis decoders of said dual phase trellis decoder, selecting the minimum of said stored path metrics to generate the most likely path for each particular state of said first and second trellis decoders and selecting a survivor path corresponding to said selected minimum path metric, and generating a Path Metric Minimum function, wherein said dual phase trellis decoder further includes a selected Branch Metric signal, an improved receiver apparatus comprising:

a trellis decoder with a Path Metric Minimum Average generator wherein said Path Metric Minimum Average is an average of said Path Metric Minimum function and is an indication of the reliability of the survivor paths being selected by said dual phase trellis decoder;

said equalizer control unit further including a Tap Control signal generator in said equalizer control unit coupled to said decision feedback equalizer wherein said Tap Control signal at each tap position of said tapped delay line is a first value if the symbol at a tap is a symbol with a high reliability of being correct and a second value if the symbol at said tap is a symbol that could not be reliably predicted;

a Noise Enhancement signal generator in said decision feedback equalizer responsive to said Tap Control signal to generate a Noise Enhancement signal proportional to the level of noise in said receiver;

said trellis decoder further including a Branch Metric signal modification circuit responsive to said Noise Enhancement signal to modify said selected Branch Metric signal in said trellis decoder to produce an adjusted selected Branch Metric signal; and said trellis decoder further being responsive to said adjusted selected Branch Metric signal and said normal/robust signal in said dual phase trellis decoder to generate said Path Metric Minimum Average.

72. A receiver apparatus in accordance with claim 71, wherein said Tap Control signal is said first value when, said decision feedback equalizer is operated in a DFE mode, and said normal/robust signal indicates a normal data transmission, and said Path Metric Minimum Average is below a given normal symbol threshold,

OR said decision feedback equalizer is operated in a DFE, and said normal/robust signal indicates a robust data transmission, and said Path Metric Minimum Average is below a given robust symbol threshold.

73. A receiver apparatus in accordance with claim 71 further including a Noise Enhancement signal generator comprising:

an inverter coupled to said Tap Control signal to form a negated Tap Control signal, wherein negating said Tap Control signal means substituting said first value for said second value and substituting said second value for said first value;

a multiplier responsive to said negated Tap Control signal and a corresponding coefficient of said decision feedback equalizer corresponding to a tap of said tapped delay line of said decision feedback equalizer to form a scaled coefficient for said tap;

a squaring circuit responsive to each said scaled coefficient to form a squared scaled coefficient for each tap of said tapped delay line; and an adder circuit responsive to said squared scaled coefficient for each tap of said tapped delay line to form said Noise Enhancement signal.

74. A receiver apparatus in accordance with claim 71, further including a Noise Enhancement signal generator, further including a tapped delay line for storing past soft decision symbols (I), said generator comprising:

a subtractor circuit coupled to I and I^, the output of said subtractor circuit being the difference term (I−I^) between past soft decision symbols (I) and hard decision symbols (I^);

a multiplier coupled to said difference term (I−I^), the output of said multiplier being the difference term (I−I^) multiplied by a corresponding coefficient of said decision feedback equalizer corresponding to a tap of said tapped delay line of said decision feedback equalizer to form a scaled coefficient for said tap;

a squaring circuit coupled to each said scaled coefficient to form a squared scaled coefficient for each tap of said tapped delay line; and an adder circuit responsive to said squared scaled coefficient for each tap of said tapped delay line to form said Noise Enhancement signal.

75. In a communication system having a transmitter providing trellis encoded symbols, and a receiver including a trellis decoder, wherein said communication system is responsive to first and second data corresponding to respective first and second symbols, said transmitter encoding said first data by a normal encoding method and encoding said second data by a robust encoding method and multiplexing normal encoded data with robust encoded data, to form encoded multiplexed data, said receiver further including a normal/robust signal coupled to said trellis decoder, a method comprising:

storing a first plurality of constellation points corresponding to the constellation points of said normal encoded data:

storing a second plurality of constellation points corresponding to the constellation points of said robust encoded data:

receiving a channel symbol corresponding to said encoded multiplexed data;

computing a first absolute minimum value of a difference between said channel symbol and the ideal value of the nearest constellation point of said first plurality of constellation points for that said channel symbol when said normal/robust signal indicates a normal data transmission as a first Branch Metric signal;

computing a second absolute minimum value of the difference between said channel symbol and the ideal value of the nearest constellation point of said second plurality of constellation points for that said channel symbol when said normal/robust signal indicates a robust transmission as a second Branch Metric signal;

modifying said first Branch Metric signal to provide an adjusted first Branch Metric signal;

modifying said second Branch Metric signal to provide an adjusted second Branch Metric signal;

adding a first stored path metric to said adjusted first Branch Metric signal to provide a first adjusted path metric;

adding a second stored path metric to said adjusted second Branch Metric signal to provide a second adjusted path metric;

selecting the minimum of said first adjusted path metric and said second adjusted path metric to provide a selected minimum path metric; and selecting a path metric value and survivor data corresponding to said selected minimum path metric.

76. A method in accordance claim 75, wherein said step of modifying said first or second Branch Metric signal each comprises:

generating a Noise Enhancement signal proportional to the level of noise in said receiver; and modifying one of said first Branch Metric signal and said second Branch Metric signal using said Noise Enhancement signal to provide respective one of said adjusted first Branch Metric signal and said second Branch Metric signal.

77. A method in accordance claim 75, wherein said step of modifying said first or second Branch Metric signal each comprises:

generating a Noise Enhancement signal proportional to the level of noise in said receiver;

computing a Confidence factor from said Noise Enhancement Signal and the long average of channel noise (average noise), wherein said Confidence factor is a scaling factor proportional to the confidence in the received symbol at that time; and modifying one of said first Branch Metric signal and said second Branch Metric signal using said Confidence factor as a scaling factor to multiply respective ones of said first Branch Metric signal and said second Branch Metric signal to provide respective ones of said adjusted first Branch Metric and said adjusted second Branch Metric.

78. A method in accordance claim 75, wherein said step of modifying said first or second Branch Metric each comprises:

generating a Noise Enhancement signal proportional to the level of noise in said receiver;

computing a Confidence factor from said Noise Enhancement Signal and the long average of channel noise (average noise), wherein said Confidence factor is a scaling factor proportional to the confidence in the received symbol at that time;

modifying one of said first Branch Metric and said second Branch Metric using said Confidence factor as a scaling factor to multiply respective ones of said first Branch Metric and said second Branch Metric to provide respective ones of scaled first Branch Metric and scaled second Branch Metric;

squaring respective ones of said scaled first Branch Metric and said scaled second Branch Metric to provide respective ones of squared first Branch Metric signal and squared second Branch Metric signal; and processing respective ones of said squared first Branch Metric signal and said squared second Branch Metric signal in a log-likelihood look up table to provide respective ones of said adjusted first Branch Metric signal and said adjusted second Branch Metric signal.

79. In a communication system having a transmitter providing trellis encoded symbols, and a receiver including a trellis decoder, wherein said communication system is responsive to first and second data corresponding to respective first and second symbols, said transmitter encoding said first data by a normal encoding method and encoding said second data by a robust encoding method and multiplexing normal encoded data with robust encoded data, to form encoded multiplexed data, said receiver further including a normal/robust signal coupled to said trellis decoder, said receiver comprising:

a first memory in which a first plurality of constellation points corresponding to the constellation points of said normal encoded data is stored:

a second memory in which a second plurality of constellation points corresponding to the constellation points of said robust encoded data is stored:

said receiver providing a channel symbol corresponding to said encoded multiplexed data;

a first subtractor circuit generating a difference of said channel symbol and an ideal value of the nearest constellation point of said first plurality of constellation points stored in said first memory for that said channel symbol when said normal/robust signal indicates a normal data transmission as a first Branch Metric signal;

a first absolute minimum value circuit responsive to said first subtractor circuit;

a second subtractor circuit generating a difference of said channel symbol and an ideal value of the nearest constellation point of said second plurality of constellation points stored in said second memory for that said channel symbol when said normal/robust signal indicates a normal data transmission as a second Branch Metric signal;

a second absolute minimum value circuit responsive to said second subtractor circuit;

a first multiplier responsive to said first Branch Metric signal to provide an adjusted first Branch Metric signal;

a second multiplier responsive to said second Branch Metric signal to provide an adjusted second Branch Metric signal;

a first adder responsive to a first stored path metric and said adjusted first Branch Metric signal to provide a first adjusted path metric;

a second adder responsive to a second stored path metric and said adjusted second Branch Metric signal to provide a second adjusted path metric;

a comparator circuit responsive to said first adjusted path metric and said second adjusted path metric to provide a selected minimum path metric; and a selector circuit responsive to said selected minimum path metric to select a path metric value and survivor data corresponding to said selected minimum path metric.

80. An apparatus in accordance claim 79, further comprising:

a Noise Enhancement signal generator to generate a Noise Enhancement signal proportional to a level of noise in said receiver; and first and second multipliers responsive to respective ones of said first Branch Metric signal and said second Branch Metric signal and said Noise Enhancement signal to provide respective ones of said adjusted first Branch Metric signal and said second Branch Metric signal.

81. An apparatus in accordance claim 79, further comprising:

a Noise Enhancement signal generator to generate a Noise Enhancement signal proportional to a level of noise in said receiver;

a multiplier responsive to said Noise Enhancement Signal and a long average of channel noise (average noise) to form a Confidence factor, wherein said Confidence factor is a scaling factor proportional to the confidence in the received symbol at that time; and first and second multipliers responsive to respective ones of said first Branch Metric signal and said second Branch Metric signal and said Confidence factor as a scaling factor to provide respective ones of said adjusted first Branch Metric signal and said second Branch Metric signal.

82. An apparatus in accordance claim 79, further comprising:

a Noise Enhancement signal generator to generate a Noise Enhancement signal proportional to the level of noise in said receiver;

a first multiplier responsive to said Noise Enhancement Signal and the long average of channel noise (average noise) to form a Confidence factor, wherein said Confidence factor is a scaling factor proportional to the confidence in the received symbol at that time;

first and second multipliers responsive to respective ones of said first Branch Metric signal and said second Branch Metric signal and said Confidence factor as a scaling factor to provide respective ones of said adjusted first Branch Metric signal and said second Branch Metric signal;

third and fourth multipliers responsive to respective ones of said adjusted first Branch Metric signal and said adjusted second Branch Metric signal to provide respective ones of squared first Branch Metric signal and squared second Branch Metric signal; and first and second log-likelihood look up tables responsive to respective ones of said squared first Branch Metric signal and said squared second Branch Metric signal to provide respective ones of said adjusted first Branch Metric signal and said adjusted second Branch Metric signal.

83. In a communication system having a transmitter and a receiver, wherein said receiver includes a decision feedback equalizer having a plurality of filter coefficients and a tapped delay line for controlling the coefficient updating of the coefficients of said decision feedback equalizer on a coefficient by coefficient basis and an equalizer control unit, a method for generating a Noise Enhancement signal proportional to a level of noise in said receiver, said method comprising:

generating a Tap Control signal in said equalizer control unit for use in said decision feedback equalizer wherein said Tap Control signal at each tap position of said tapped delay line is a first value if the symbol at a tap is a symbol with a high reliability of being correct and a second value if the symbol at said tap is a symbol that could not be reliably predicted;

inverting said Tap Control signal to form a negated Tap Control signal, wherein negating said Tap Control signal means substituting said first value for said second value and substituting said second value for said first value;

multiplying said negated Tap Control signal by a corresponding coefficient of said decision feedback equalizer corresponding to said tap of said tapped delay line of said decision feedback equalizer to form a scaled coefficient for said tap;

squaring each said scaled coefficient to form a squared scaled coefficient for each tap of said tapped delay line; and summing said squared scaled coefficient for each tap of said tapped delay line to form said Noise Enhancement signal.

84. In a communication system having a transmitter and a receiver, wherein said receiver includes a decision feedback equalizer having a plurality of filter coefficients and a tapped delay line for controlling the coefficient updating of the coefficients of said decision feedback equalizer on a coefficient by coefficient basis and an equalizer control unit, an apparatus for generating a Noise Enhancement signal proportional to a level of noise in said receiver, said apparatus comprising:

generating a Tap Control signal in said equalizer control unit for use in said decision feedback equalizer wherein said Tap Control signal at each tap position of said tapped delay line is a first value if the symbol at a tap is a symbol with a high reliability of being correct and a second value if the symbol at said tap is a symbol that could not be reliably predicted;

an inverter coupled to said Tap Control signal to form a negated Tap Control signal, wherein negating said Tap Control signal means substituting said first value for said second value and substituting said second value for said first value;

a multiplier responsive to said negated Tap Control signal and a corresponding coefficient of said decision feedback equalizer corresponding to the tap of said tapped delay line of said decision feedback equalizer to form a scaled coefficient for said tap;

a squaring circuit responsive to each said scaled coefficient to form a squared scaled coefficient for each tap of said tapped delay line; and an adder circuit responsive to said squared scaled coefficient for each tap of said tapped delay line to form said Noise Enhancement signal.

85. In a communication system having a transmitter and a receiver, wherein said receiver includes a decision feedback equalizer having a plurality of filter coefficients and a tapped delay line for controlling the coefficient updating of the coefficients of said decision feedback equalizer on a coefficient by coefficient basis and an equalizer control unit, further including a tapped delay line for storing past soft decision symbols (I), a method for generating a Noise Enhancement signal proportional to a level of noise in said receiver, said method comprising:

generating a Tap Control signal in said equalizer control unit for use in said decision feedback equalizer wherein said Tap Control signal at each tap position of said tapped delay line is a first value if the symbol at a tap is a symbol with a high reliability of being correct and a second value if the symbol at said tap is a symbol that could not be reliably predicted;

computing the difference term (I–I^) between past soft decision symbols (I) and hard decision symbols (I^);

multiplying the difference term (I–I^) by a corresponding coefficient of said decision feedback equalizer corresponding to the tap of said tapped delay line of said decision feedback equalizer to form a scaled coefficient for said tap;

squaring each said scaled coefficient to form a squared scaled coefficient for each tap of said tapped delay line; and summing said squared scaled coefficient for each tap of said tapped delay line to form said Noise Enhancement signal.

86. In a communication system having a transmitter and a receiver, wherein said receiver includes a decision feedback equalizer having a plurality of filter coefficients and a tapped delay line for controlling the coefficient updating of the coefficients of said decision feedback equalizer on a coefficient by coefficient basis and an equalizer control unit, further including a tapped delay line for storing past soft decision symbols (I), an apparatus for generating a Noise Enhancement signal proportional to a level of noise in said receiver, said apparatus comprising:

said equalizer control unit further including a Tap Control signal generator in said equalizer control unit coupled to said decision feedback equalizer wherein said Tap Control signal at each tap position of said tapped delay line is a first value if the symbol at a tap is a symbol with a high reliability of being correct and a second value if the symbol at said tap is a symbol that could not be reliably predicted;

a subtractor circuit coupled to I and I^, the output of said subtractor circuit being the difference term (I–I^) between past soft decision symbols (I) and hard decision symbols (I^);

a multiplier coupled to said difference term (I–I^), the output of said multiplier being the difference term (I–I^) multiplied by a corresponding coefficient of said decision feedback equalizer corresponding to the tap of said tapped delay line of said decision feedback equalizer to form a scaled coefficient for said tap;

a squaring circuit coupled to each said scaled coefficient to form a squared scaled coefficient for each tap of said tapped delay line; and an adder circuit responsive to said squared scaled coefficient for each tap of said tapped delay line to form said Noise Enhancement signal.

* * * * *